(12) United States Patent
Jacob

(10) Patent No.: US 8,581,429 B2
(45) Date of Patent: Nov. 12, 2013

(54) TURBINE-GENERATOR SYSTEMS AND METHODS

(76) Inventor: Joseph Sajan Jacob, Norcross, GA (US)

( * ) Notice: Subject to any disclaimer, the term of this patent is extended or adjusted under 35 U.S.C. 154(b) by 446 days.

(21) Appl. No.: 12/954,012

(22) Filed: Nov. 24, 2010

(65) Prior Publication Data

US 2012/0126539 A1    May 24, 2012

(51) Int. Cl.
*H02P 9/04* (2006.01)
(52) U.S. Cl.
USPC .............................................. 290/52; 290/1 A
(58) Field of Classification Search
USPC ................................... 290/1 A, 2, 52; 60/409
See application file for complete search history.

(56) References Cited

U.S. PATENT DOCUMENTS

| | | | |
|---|---|---|---|
| 5,553,454 A * | 9/1996 | Mortner | 60/409 |
| 6,031,294 A * | 2/2000 | Geis et al. | 290/52 |
| 6,064,122 A * | 5/2000 | McConnell | 290/32 |
| 6,512,305 B1 * | 1/2003 | Pinkerton et al. | 290/52 |
| 7,642,664 B1 * | 1/2010 | Andrews et al. | 290/1 A |
| 2013/0134713 A1 * | 5/2013 | Jacob | 290/52 |

* cited by examiner

*Primary Examiner* — Nicholas Ponomarenko
(74) *Attorney, Agent, or Firm* — Kilpatrick Townsend & Stockton LLP

(57) ABSTRACT

A turbine-generator system includes a power source powered by renewable energy. The power source drives a compressor, which outputs compressed air to pressurized tanks. A turbine is connected to the tanks via one or more nozzles. The turbine includes turbine blade assemblies and a turbine flywheel, each rotatably mounted to a shaft. The nozzles deliver compressed air to the turbine blades. The turbine includes a magnet motor for selectably applying torque to the turbine flywheel. The turbine is coupled to a generator via a magnetic clutch. An external control computer controls the rotational speed of the magnet motor and the amount and timing of the compressed air injected onto the turbine blades. A load sensor is coupled to an output of the generator and is in communication with the external control computer.

10 Claims, 33 Drawing Sheets

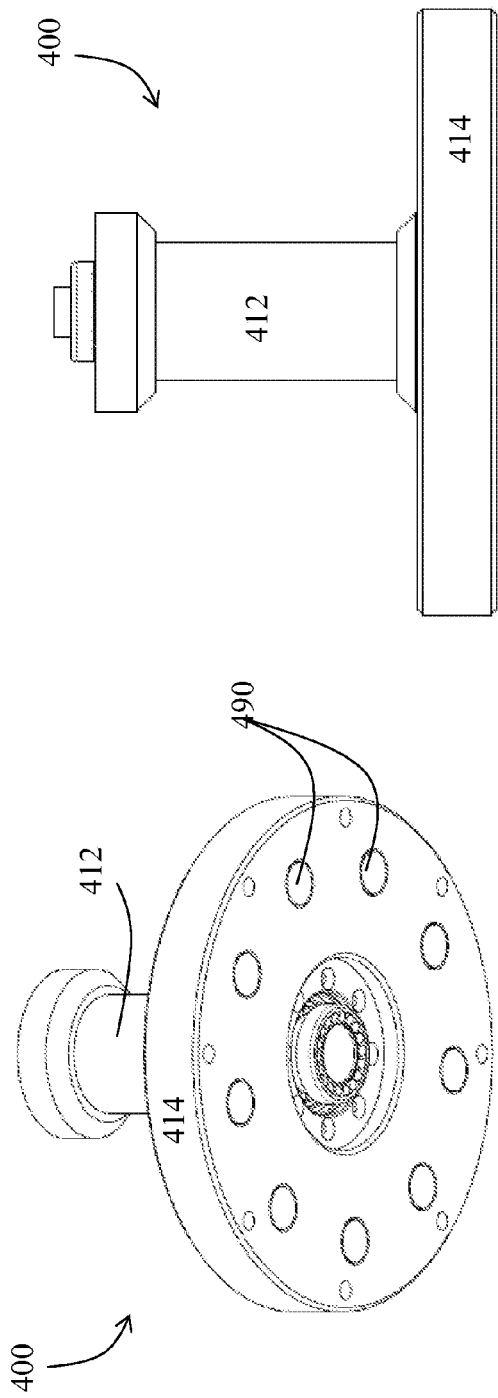
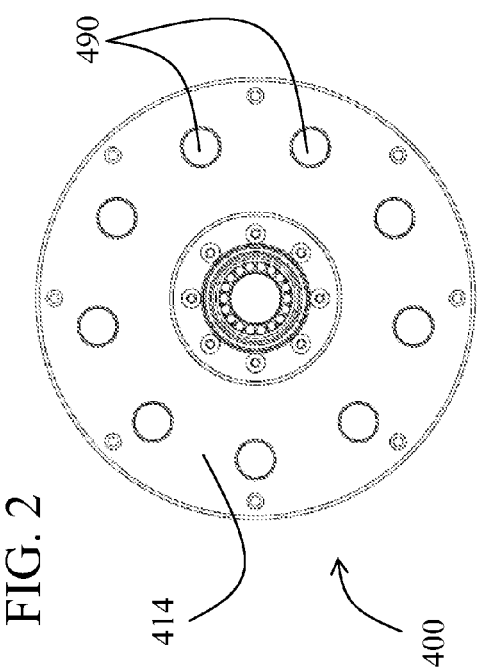

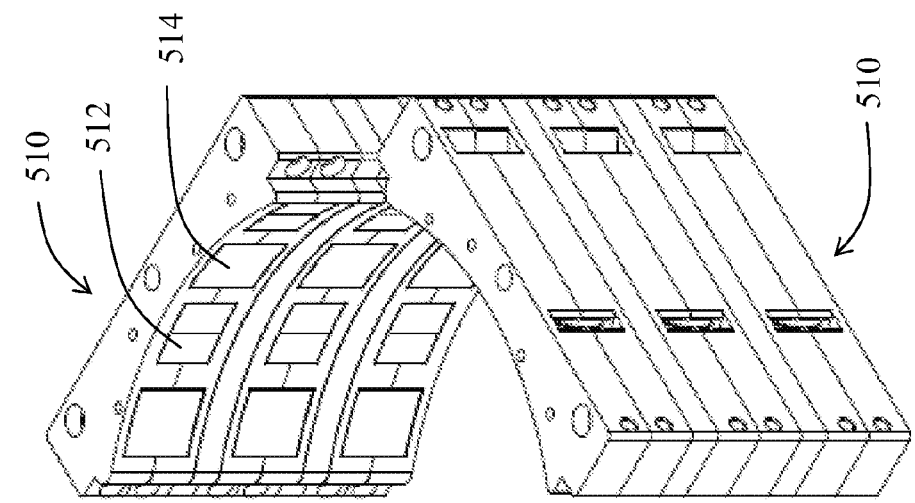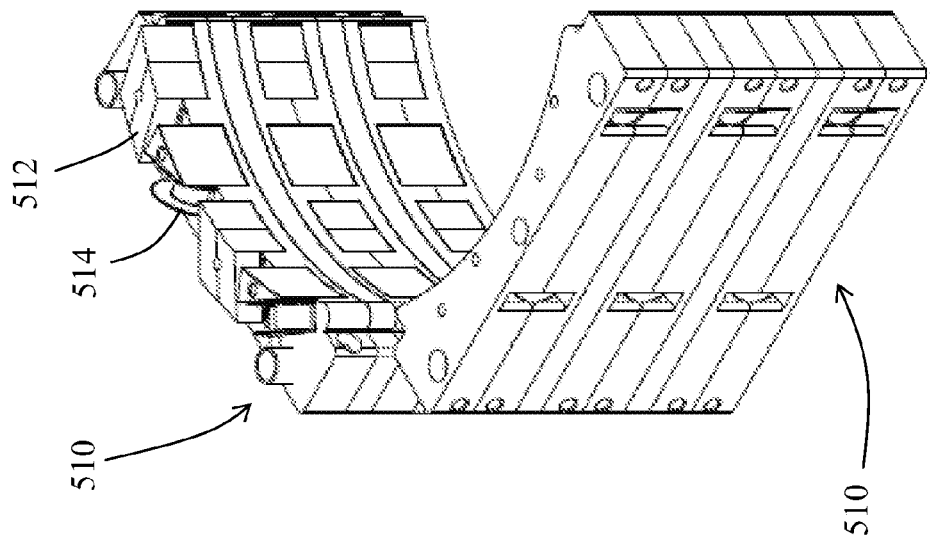
FIG. 9

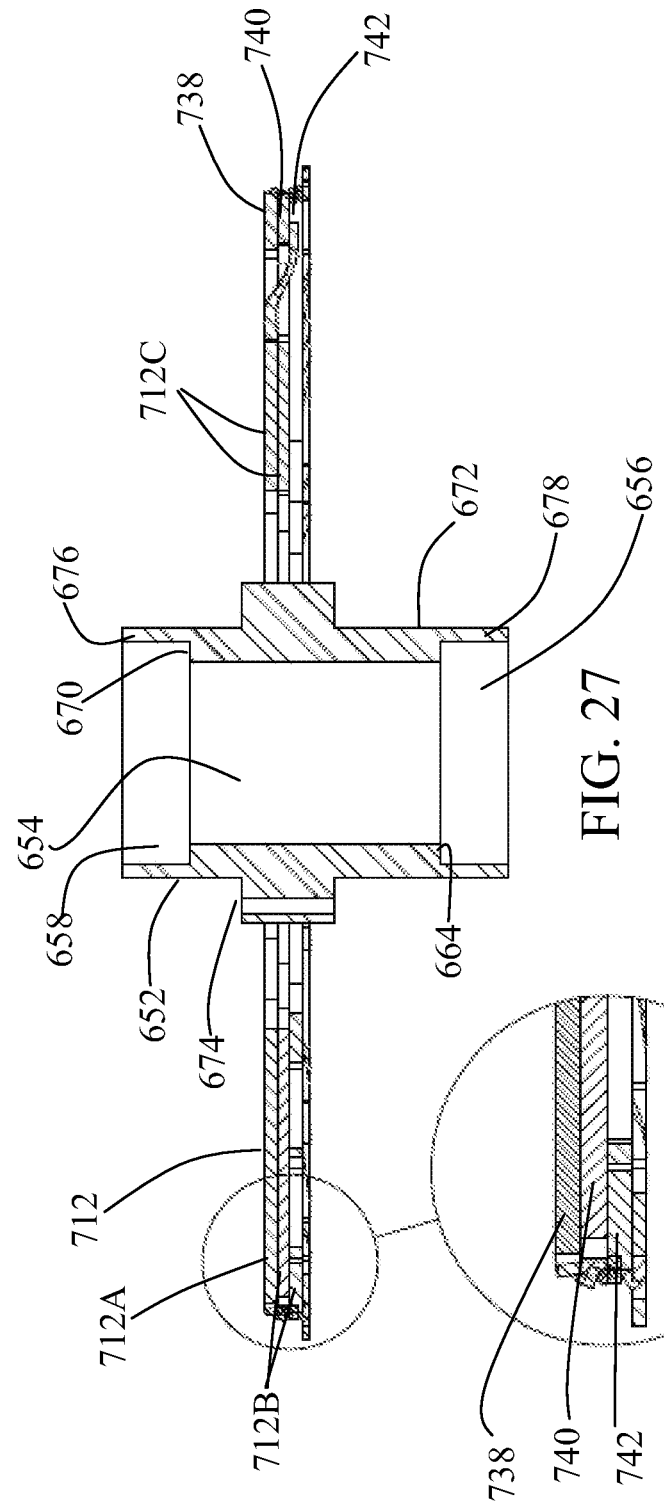

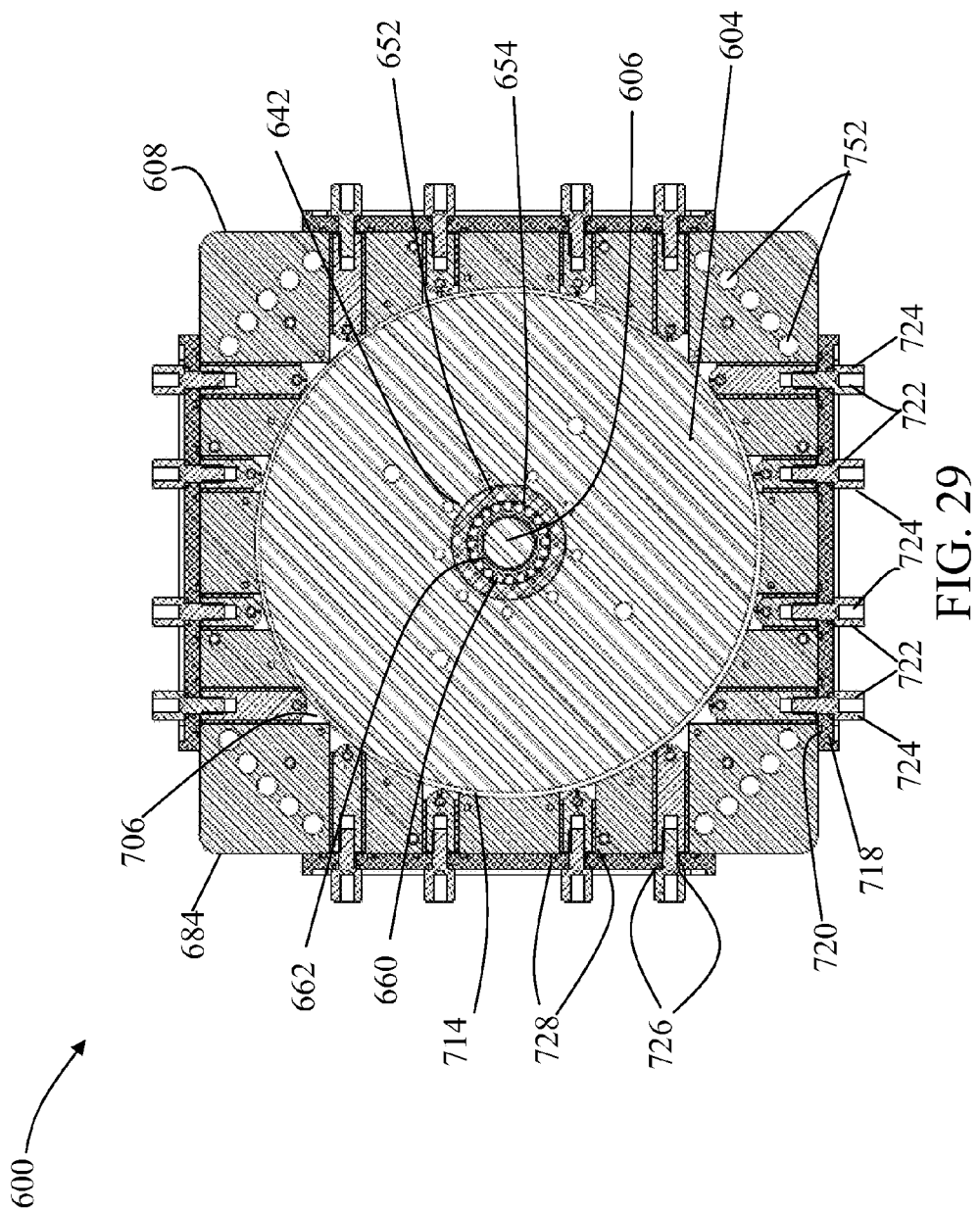

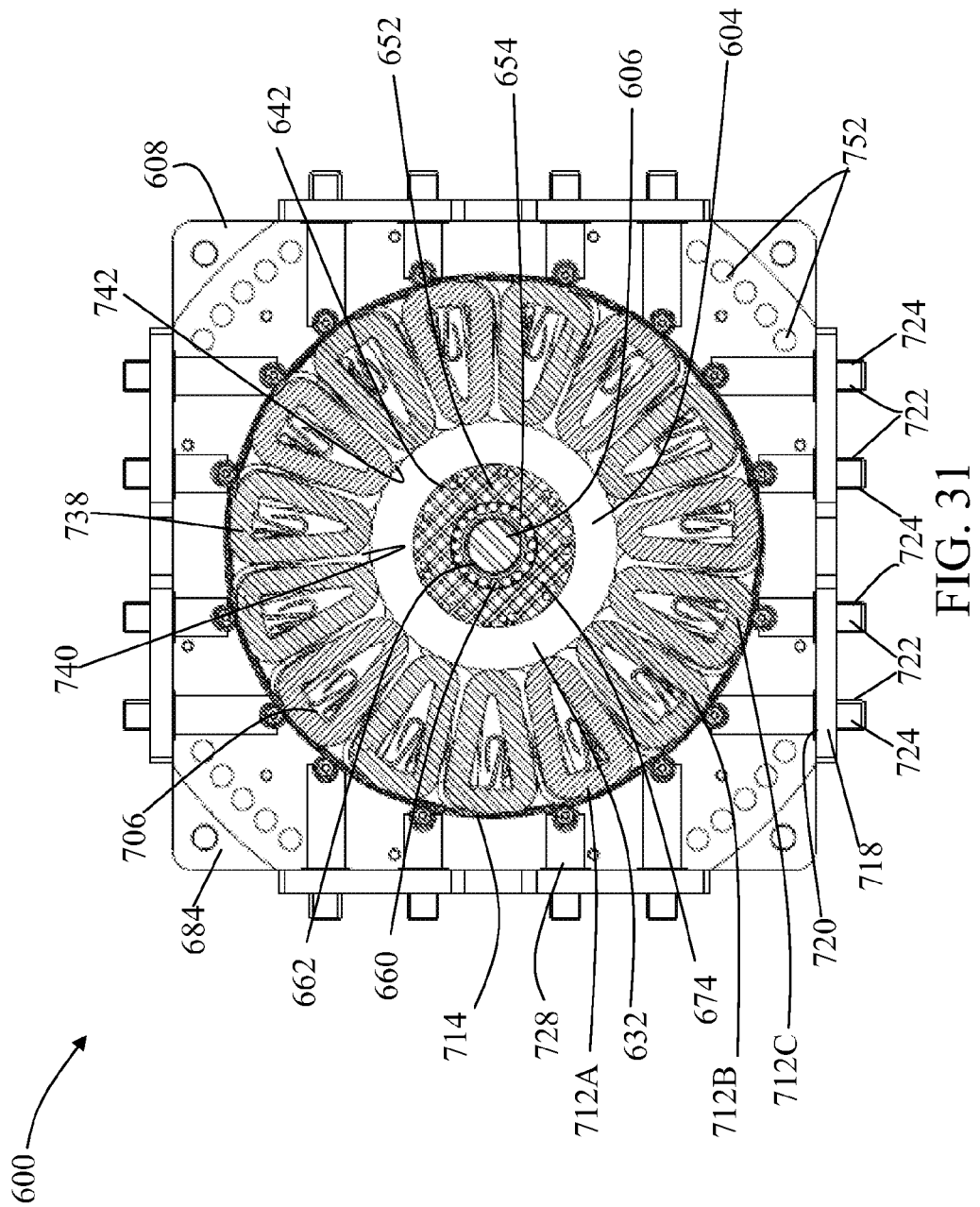

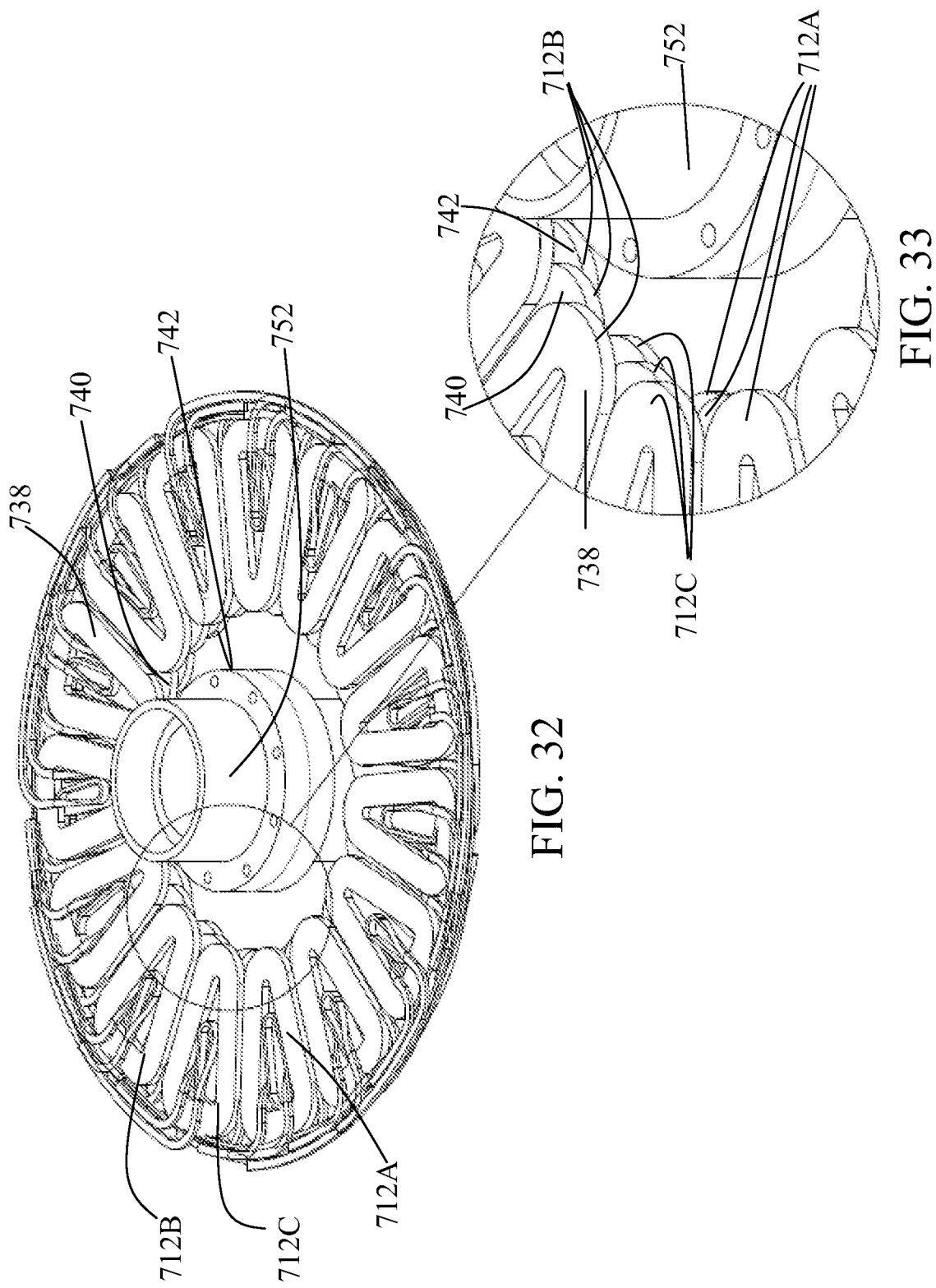

TURBINE-GENERATOR SYSTEMS AND METHODS

TECHNICAL FIELD

Embodiments of the present invention relate to turbine-generator systems and methods for controlling, using and optimizing turbine-generator systems.

BACKGROUND

Electrical generator systems in which a renewable energy, such as wind, solar, biomass, etc., is converted to electrical energy through an intermediate storage step are known in the art. For example, U.S. Pat. No. 3,806,733 discloses a wind driven electrical energy conversion apparatus in which the wind energy is converted to a pressurized air supply which is subsequently converted to rotary power by inflating air cells carried by an endless belt immersed in a tank filled with a fluid. The rotary output of the endless belt is connected to an electrical generator which produces the desired electrical power. U.S. Pat. No. 4,229,661 discloses a power plant for a camping trailer in which the wind energy is first converted to a pressurized air supply which is subsequently converted to a rotary output by an air driven turbine. The rotary output of the turbine is connected to a generator which produces the desired electrical power. U.S. Pat. No. 4,447,738 discloses a wind power electrical generator that includes a windmill mounted to a tower, an air compressor connected to the rotary output of the windmill, and an accumulator for storing the pressurized air output of the air compressor to generate a supply of pressurized air. A first air motor receives pressurized air from the accumulator to generate a rotary output, which drives an electrical generator to generate the desired electrical power. A waste air recovery mechanism includes a second air motor, which is driven by the exhaust of the first air motor to produce a rotary output supplementing the wind energy driving the air compressor.

The foregoing prior art systems are inefficient and are not capable of producing electric power on a large scale over a long period of time. Accordingly, there remains a need for a electric power generation system that can convert renewable energy to a long-term non-battery source of stored energy and then use that stored energy to generate electric power on a large scale over a long period of time.

SUMMARY

The present invention meets the above described need through novel turbine-generator systems and methods for controlling, using and optimizing turbine-generator systems. An exemplary turbine-generator system includes a power source connected to a compressor. The power source may be a solar panel, a wind turbine, sterling engine, a heat exchanger, or any other system or device for converting a renewable energy into mechanical power to drive the compressor. Accordingly, the renewable energy may be solar energy, wind, naturally occurring temperature differentials, energy produced from biomass or biofuel, etc. Compressed air output by the compressor is stored in one or more pressurized tanks connected thereto.

A turbine is connected to the one or more pressurized tanks via one or more nozzles. The turbine includes a plurality of turbine blades and a turbine flywheel, each rotatably mounted to a shaft. The one or more nozzles are aligned with the turbine blades to deliver compressed air thereto. The compressed air injected onto the turbine blades may be preheated and/or pre-charged. The turbine further includes a magnet motor for selectably applying torque to the turbine flywheel. The turbine may also include a high-torque motor for providing additional torque to the turbine flywheel. The turbine may also include one or more satellite magnet assembly positioned inside the turbine casing and aligned with the magnet motor. Each satellite magnet assembly comprises a motor, a shaft driven by the motor, and one or more permanent magnets mounted on the shaft. The rotating magnetic field of each satellite magnet assembly interacts with the magnet motor, thereby increasing the torque applied to the turbine flywheel.

The turbine is coupled to a generator via a magnetic clutch. The generator comprises a generator casing that houses within its interior an upper generator flywheel rotatably mounted to a generator shaft, a lower generator flywheel rotatably mounted to the generator shaft, and a plurality of coils positioned between the upper generator flywheel and the lower generator flywheel. The magnetic clutch may comprise a first plurality of clutch magnets fixed to a base of the turbine flywheel and a second plurality of clutch magnets fixed to a top surface of the upper generator flywheel. Preferably, the interior of the generator casing is maintained in a vacuum.

The turbine-generator system also includes a control computer external to the turbine. The external control computer is in communication with the magnet motor for selectably controlling its rotational speed. The external control computer is also in communication to the nozzles for controlling the amount and timing of the compressed air injected onto the turbine blades. If a high-torque motor is also provided within the turbine, the external control computer is in communication with it for selectably controlling its rotational speed. Likewise, if the turbine includes one or more satellite magnet assemblies, the external control computer is in communication with them for selectably controlling their rotational speed. A load sensor is coupled to an output of the generator and is in communication with the external control computer.

These and other aspects and features of the invention will be described further in the detailed description below in connection with the appended drawings and claims.

BRIEF DESCRIPTION OF THE FIGURES

FIG. 2 is bottom perspective view of a turbine shaft and flywheel according to certain embodiments of the invention.

FIG. 2A is a side view of a turbine shaft and flywheel according to certain embodiments of the invention.

FIG. 2B is a bottom view of a turbine shaft and flywheel according to certain embodiments of the invention.

FIG. 3A is a top perspective view of a turbine magnet/blade assembly according to certain embodiments of the invention.

FIG. 9 is a top perspective view of several casing magnet assemblies according to certain embodiments of the invention.

FIG. 27 is a cross-sectional view of the generator hub and the coils of the generator of FIG. 13 taken along line 22-22.

FIG. 28 is a partial cross-sectional view of the coils of FIG. 27.

FIG. 29 is a cross-sectional view of the generator of FIG. 26 taken along line 29-29.

FIG. 31 is a cross-sectional view of the generator of FIG. 26 taken along line 31-31.

FIG. 32 is a top perspective view of the generator hub and the coils of the generator of FIG. 13.

FIG. 33 is a partial perspective view of the generator hub and the coils of FIG. 32.

DETAILED DESCRIPTION

Figure 1:
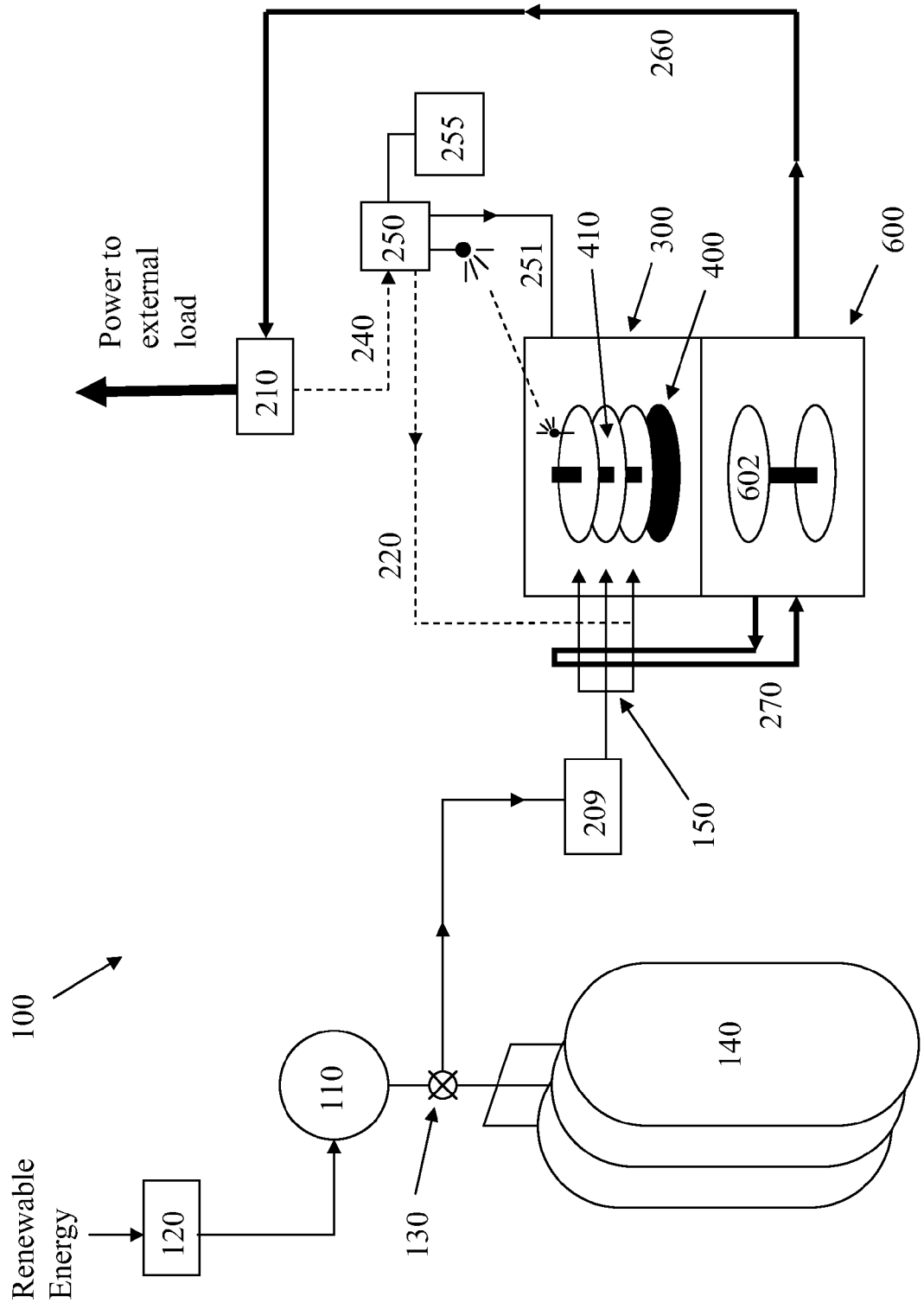
FIG. 1 is a schematic diagram of a turbine-generator system according to certain embodiments of the invention.

With reference to FIG. 1, a turbine-generator system 100 according to one embodiment of the invention includes a turbine 300 and generator 600. The turbine includes a turbine flywheel assembly 400 that is driven at least partially by compressed air. Compressed air is produced by a compressor 110 that is powered by one or more power sources 120. Preferably, the power source(s) 120 are driven by renewable energy, such as solar energy, wind, geothermal or other naturally occurring temperature differentials, biomass, biofuels, etc. Therefore, the power sources(s) 120 can include solar panels, wind turbines, sterling engines, heat exchangers and/or any other device or system for converting energy into mechanical power to drive the compressor 110. The power sources 120 could alternatively charge a battery system (not shown), which could discharge as necessary to operate the compressor 110.

Compressed air generated by the compressor 110 passes through a regulator 130 and is stored in one or more pressurized tanks 140 for later use and/or is passed to one or more selectably controllable nozzles 150 which, when opened, direct compressed air onto one or more turbine blades 415 rotatably mounted to a shaft 412 of a turbine flywheel assembly 400. As will be described below, an external control computer 250 is in communication with the nozzles 150 for controlling the amount and timing of the compressed air injected onto the turbine blades 415.

Figure 24:
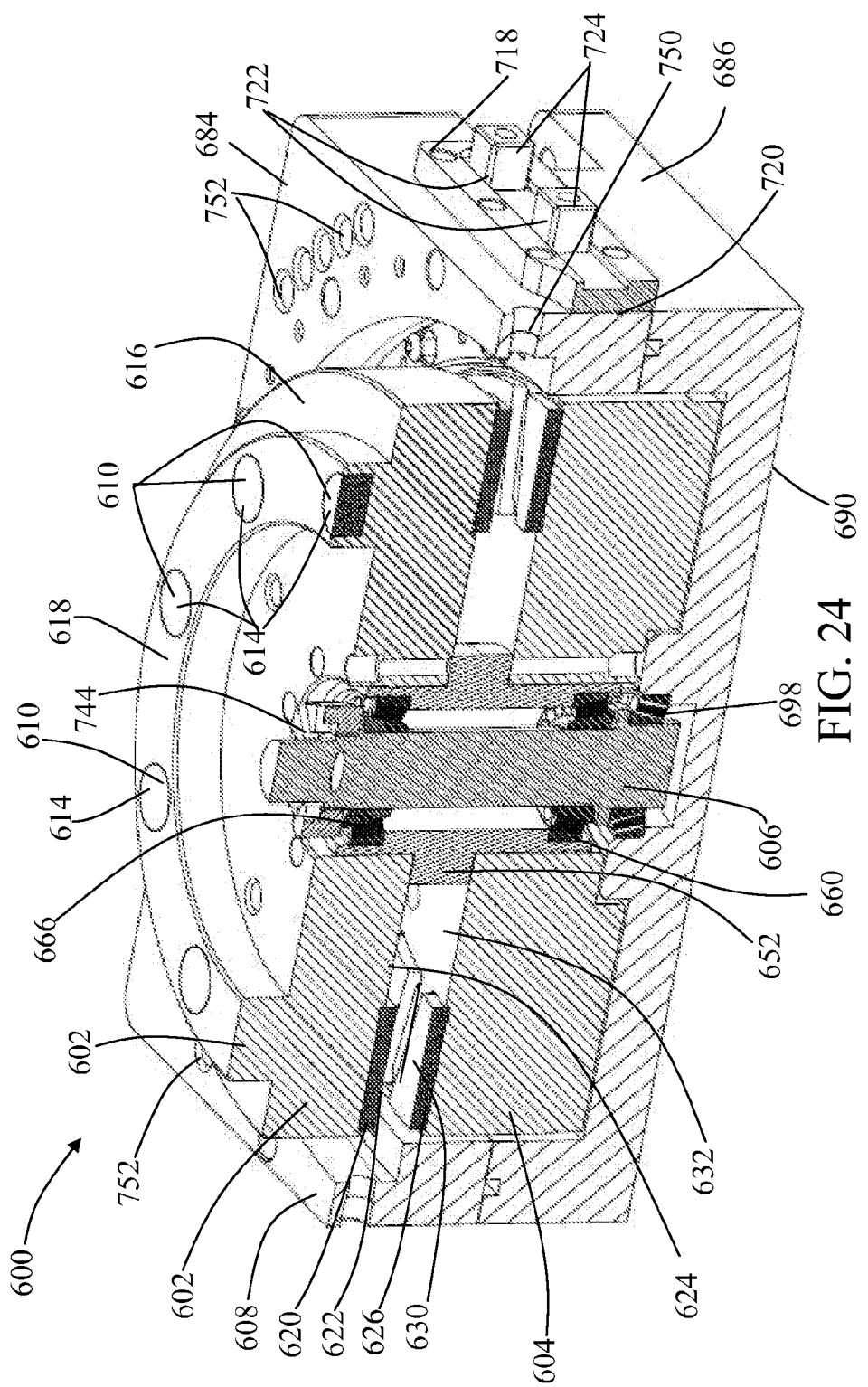
FIG. 24 is a cross-sectional perspective view of the generator of FIG. 13 taken along line 22-22 with the upper section of the generator casing and the coils removed.
Figure 25:
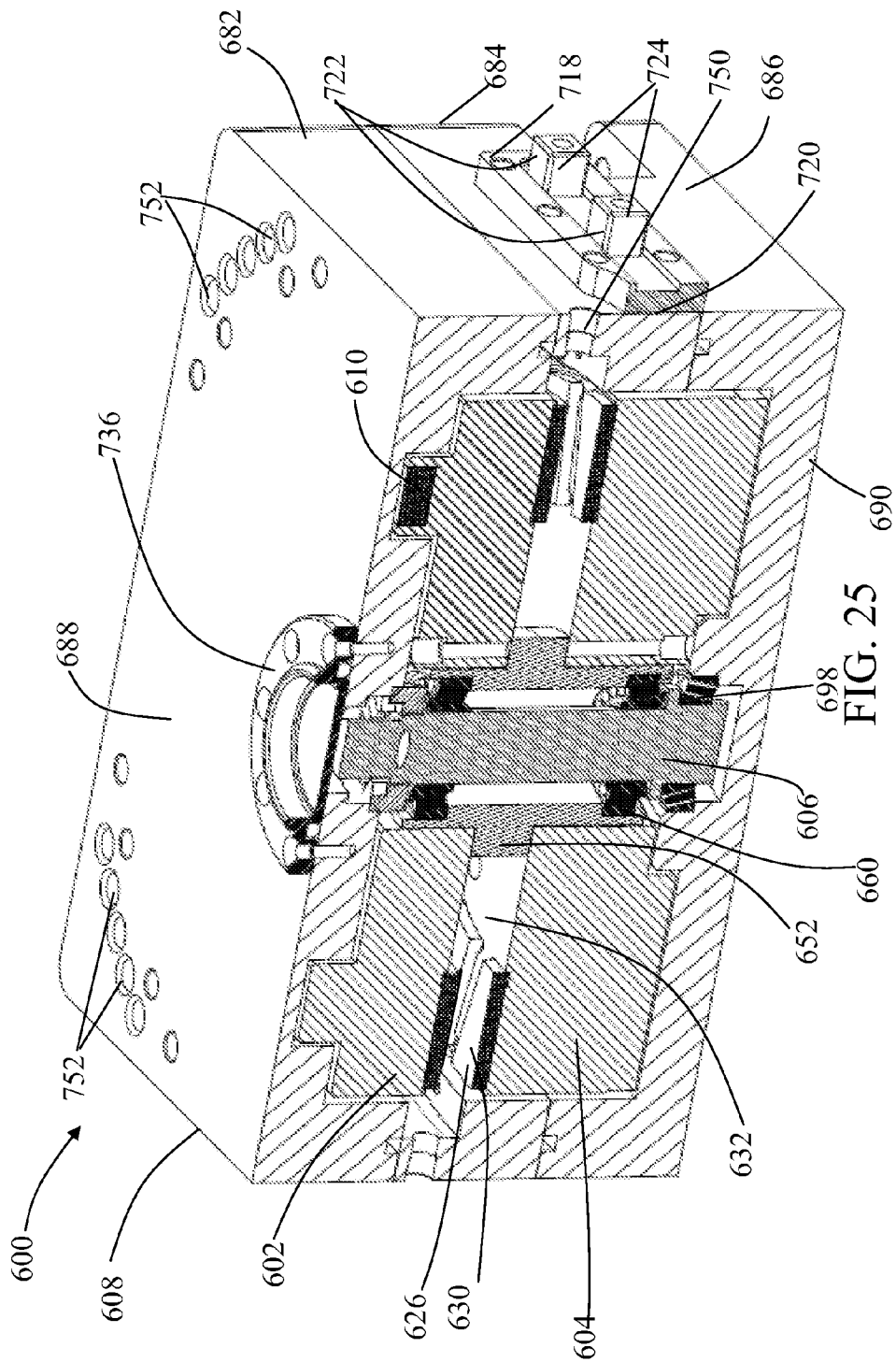
FIG. 25 is a cross-sectional perspective view of the generator of FIG. 13 taken along line 22-22 with the coils removed.

The turbine 300 and generator 600 are coupled to each other by a magnet clutch. In particular, the turbine flywheel assembly 400 and an upper generator flywheel 602 of the generator 600 are magnetically coupled to each other. This is accomplished, as illustrated in FIGS. 2 and 2B, by embedding a plurality of turbine clutch magnets 490 in the base of the turbine flywheel 414, which are magnetically coupled to a complementary plurality of generator clutch magnets 610 positioned on the upper generator flywheel 602 (see FIG. 24). Rotation of the turbine flywheel assembly 400 causes the turbine clutch magnets 490 to pull the generator clutch magnets 610, thus causing the upper generator flywheel 602 to rotate accordingly.

The turbine clutch magnets 490 and generator clutch magnets 610 are formed of neodymium or other similar magnetic material with a similar magnetic strength. In some embodiments, the turbine clutch magnets 490 and generator clutch magnets 610 are formed of N42 neodymium. The turbine clutch magnets 490 and generator clutch magnets 610 are axially magnetized, with opposite poles of the turbine clutch magnets 490 and generator clutch magnets 610 facing each other. In one embodiment, the north poles of the turbine clutch magnets 490 face downward toward the generator 600, and the south poles of the generator clutch magnets 610 face upward toward the turbine 300. In this configuration, the turbine clutch magnets 490 and generator clutch magnets 610 are attracted to one another.

The turbine flywheel assembly 400 and upper generator flywheel 602 are thus not mechanically coupled to one another, rather, they are connected by a magnetic clutch. By magnetically coupling the turbine flywheel assembly 400 and upper generator flywheel 602 in this manner, the interior of the generator 600 can be sealed and maintained in a vacuum, which reduces friction within the generator 600. Maintaining a vacuum within the generator 600 also reduces electrical noise due to static electricity from air in the generator 600.

Turbine

The operation of the turbine 300 is described with reference to FIGS. 2-12. The turbine 300 has a turbine casing 500 (see FIG. 6), which houses the turbine flywheel assembly 400. The turbine casing 500 can be formed of any suitable construction material, including but not limited to polypropylene, aluminum, acrylonitrile-butadiene-styrene ("ABS"), ABS+(ABS plus, a form of ABS having higher temperature resistance), polylactic acid, mild steel (such as A36 mild steel), and acetal (such as Delrin®, available from DuPont). In one embodiment, the turbine casing 500 is formed from a polypropylene co-polymer.

Figure 3:
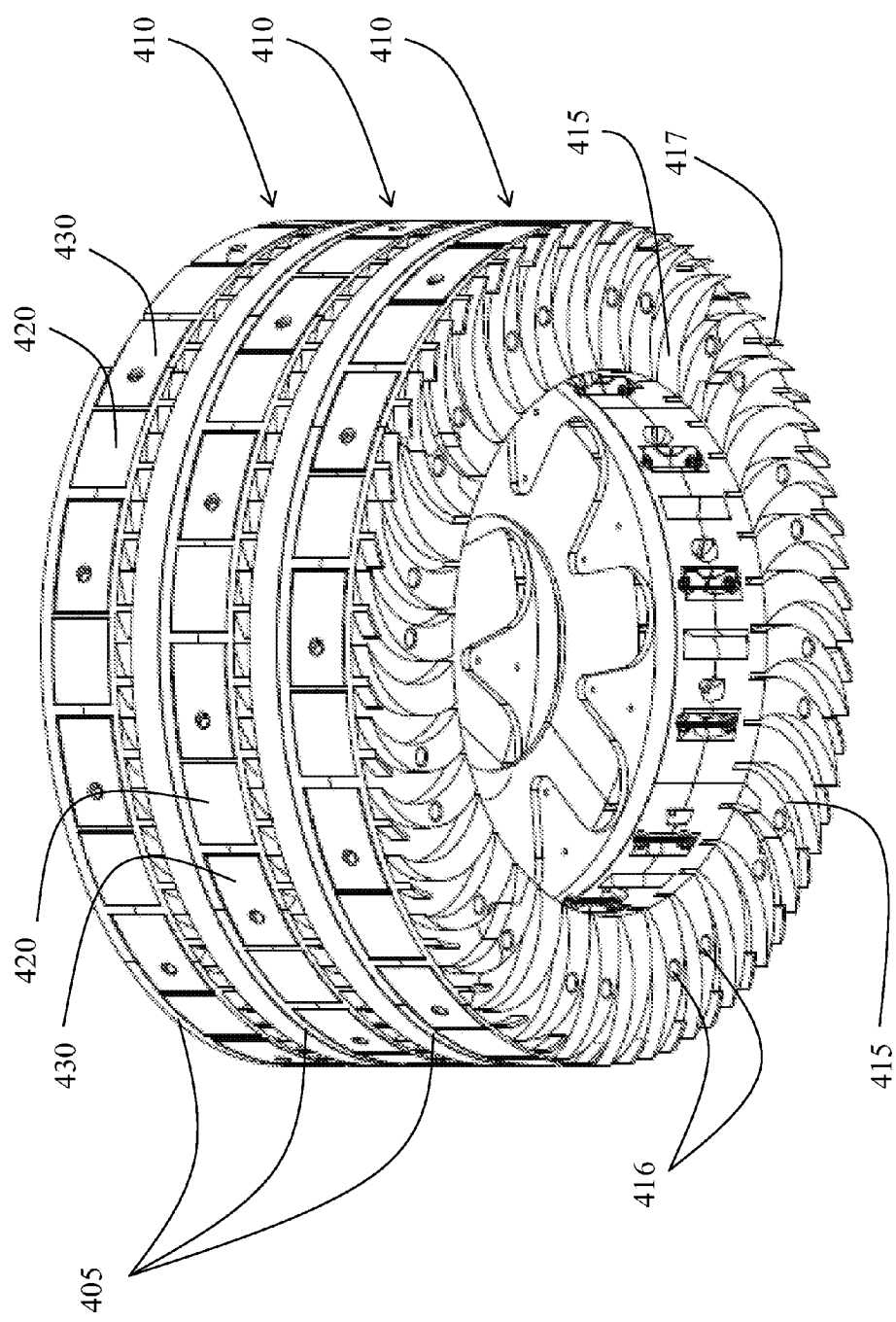
FIG. 3 is a bottom perspective view of a plurality of turbine magnet/blade assemblies according to certain embodiments of the invention.
Figure 4:
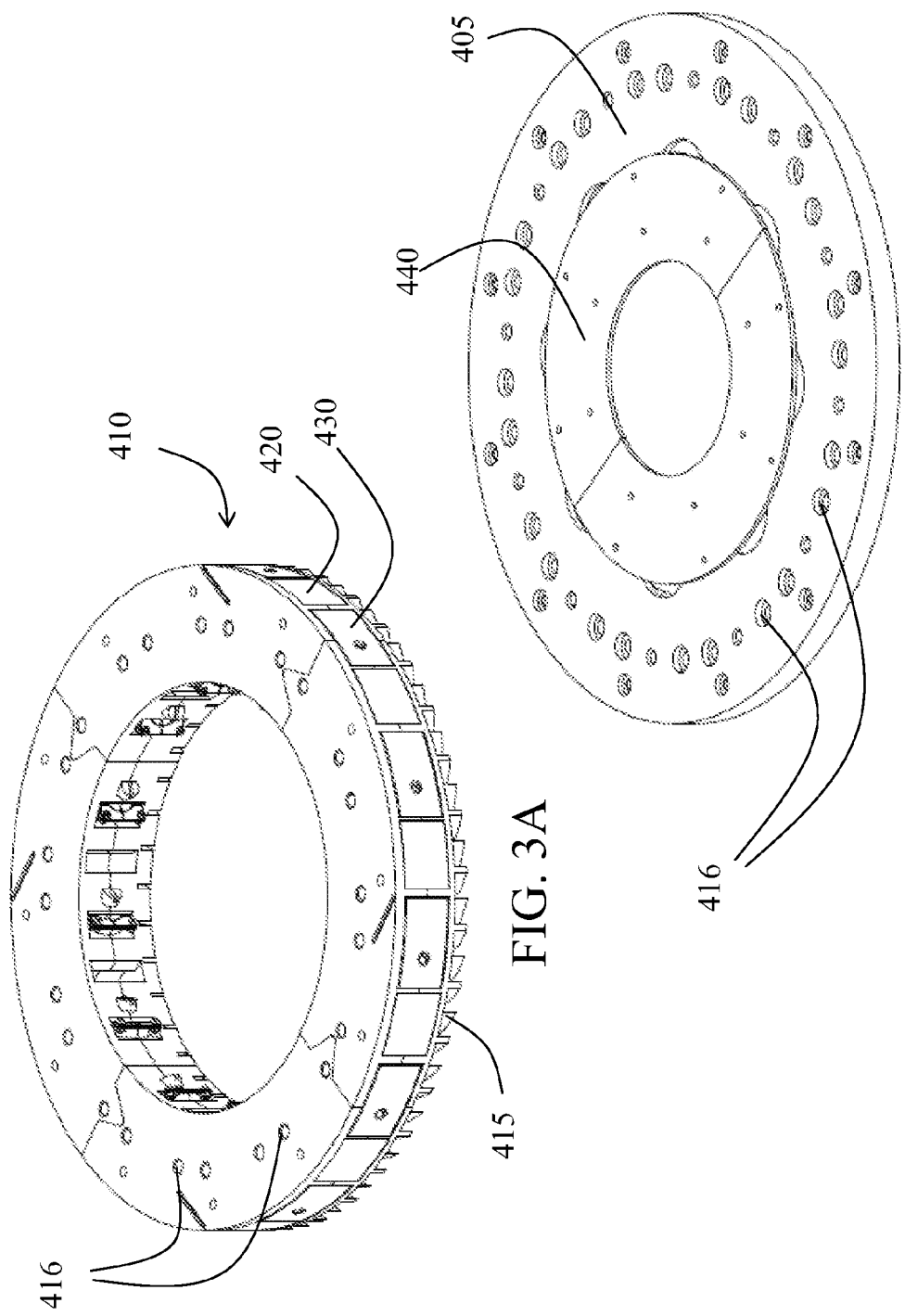
FIG. 4 is a top perspective view of a support member according to certain embodiments of the invention.

The turbine flywheel assembly 400 includes a shaft 412, a turbine flywheel 414 (see, e.g., FIGS. 2, 2A and 2B) and one or more turbine magnet/blade assemblies 410 (see, e.g., FIGS. 3 and 3A). In preferred embodiments, there are three turbine magnet/blade assemblies 410. The turbine flywheel 414 and the turbine magnet/blade assemblies 410 may be rotatably connected to the shaft 412 using pairs of nested bearings 413 (see, e.g., FIGS. 6 and 7). A typical nested bearing configuration includes a plurality of tapered roller bearings. However, one of skill in the art will understand that other bearing designs may be used. This nested bearing arrangement allows the turbine magnet/blade assemblies 410 and the turbine flywheel 414 to rotate around the shaft 412 and also allows the shaft 412 to rotate relative to the turbine casing 500, which reduces stress on the shaft 412 due to the high torques operating thereon.

In one embodiment, each turbine magnet/blade assembly 410 includes a support member 405 (see, e.g., FIGS. 3-5) supporting a ring of turbine blades 415 and a ring of alternating flywheel permanent magnets 420 and flywheel electromagnets 430. The flywheel permanent magnets 420 and flywheel electromagnets 430 are configured to interact with magnet assemblies 510 positioned in the turbine casing 500 (described below with reference to FIGS. 5-10), to provide torque to the turbine magnet/blade assemblies 410 and assist in maintaining the speed of the turbine magnet/blade assemblies 410 (and thus the turbine flywheel 414) as they rotate around the shaft 412. The combination of the rotating flywheel permanent magnets 420, flywheel electromagnets 430 and the stationary casing permanent magnets and casing electromagnets forms a magnet motor, as further discussed below.

The turbine flywheel 414, the shaft 412, the support member 405 and the turbine blades 415 are preferably formed from material(s) that can withstand the operating rotation speeds without failing but that is/are also lightweight to minimize the required starting and operating torques of the turbine flywheel assembly 400. Suitable materials include, but are not limited to, polypropylene, aluminum, ABS, ABS+, polylactic acid, mild steel (such as A36 mild steel), and acetal (such as Delrin®). In one embodiment, these components are turbine flywheel 414, the shaft 412 and support member 405 are formed from A36 mild steel, and the turbine blades 415 are formed from polypropylene.

Figure 5:
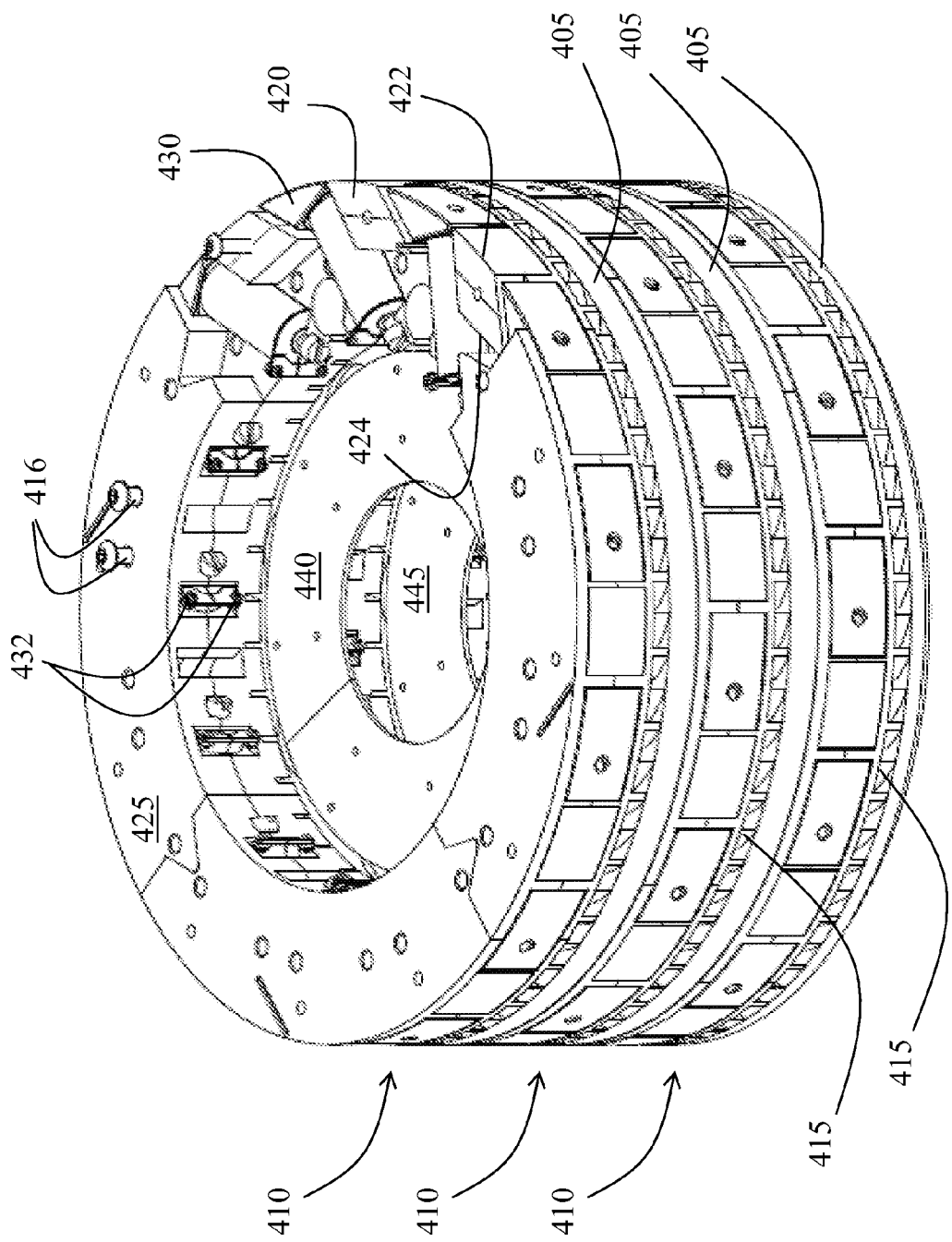
FIG. 5 is a top perspective view of a plurality of turbine magnet/blade assemblies according to certain embodiments of the invention.

In some embodiments, as shown for example in FIG. 3, FIG. 3A and FIG. 5, the flywheel permanent magnets 420 and flywheel electromagnets 430 of each turbine magnet/blade assembly 410 are arranged in an alternating pattering within a magnet housing 425. As shown, the magnet housing 425 may be ring-shaped and may be configured to securely hold the magnets in place. Accordingly, it may be preferable to extrude or mold the magnet housing 425 from a lightweight, high strength material such as, but not limited to, polypropylene, aluminum, ABS, ABS+, polylactic acid, mild steel (such as A36 mild steel), and acetal (such as Delrin®). A support member 405 may be mounted to the top of each magnet housing 425.

In some embodiments, such as shown in FIG. 3, FIG. 3A, and FIG. 5, the turbine blades 415 may be formed as an integral part of each magnet housing 425, e.g., through the extruding or molding process. Alternatively, the turbine blades 415 may be formed separate from the magnet housing 425 but may be coupled to the magnet housing 425 using an adhesive and/or mechanical fastener. In still other embodiments, the magnet housing 425 and the turbine blades 415 are separate components that are positioned at a distance from each other within the turbine casing 500, as described with respect to FIG. 12.

The turbine blades 415 may be configured to maximize the force of the compressed air applied thereto via the nozzles 150. One such configuration, which is illustrated in FIG. 3, includes a notch 417 provided between adjacent turbine blades 415. The notch "guides" the compressed air onto a preferred location on each turbine blade 415 (i.e., closer to the tangent of the blade), further increasing the efficiency of the turbine 300. The nozzles 150 may be positioned in inlet holes 419 (see, e.g., FIGS. 5A and 5B), which may be aligned with the turbine blades 415. In some embodiments, the inlet holes 419 may be in one corner of the turbine casing 500. In other embodiments, the inlet holes 419 may be at other positions along one or more side of the turbine casing 500.

The magnet housing 425 may be configured such that the flywheel permanent magnets 420 and flywheel electromagnets 430 fit tightly within spaces therein, such as by interference fit. In some embodiments, the magnet housing 425 is molded or otherwise formed into two halves, a top half and a bottom half, each half including spaces for receiving a portion of the flywheel permanent magnets 420 and flywheel electromagnets 430. In this arrangement, the magnets are sandwiched between the top and bottom halves of the magnet housing 425. It will be recognized, of course, that other arrangements could be used to secure the flywheel permanent magnets 420 and flywheel electromagnets 430 to the support member 405 and that the described magnet housing 425 may not be necessary. For example, the flywheel permanent magnets 420 and flywheel electromagnets 430 could be mounted directly onto the support member 405 or a one-piece magnet housing 425 may be used.

Figure 6:
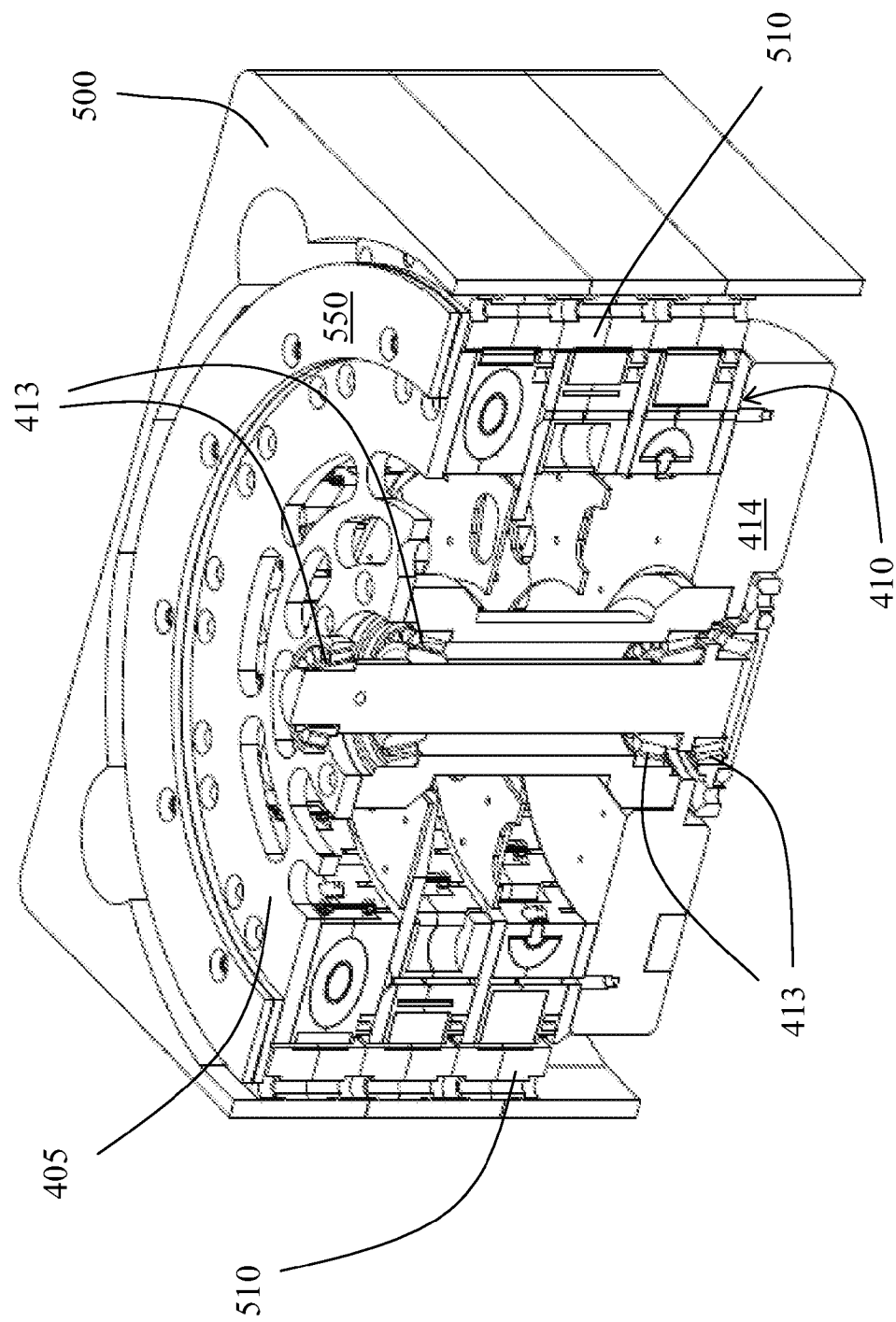
FIG. 6 is a top perspective cutout view of a turbine according to certain embodiments of the invention.
Figure 7:
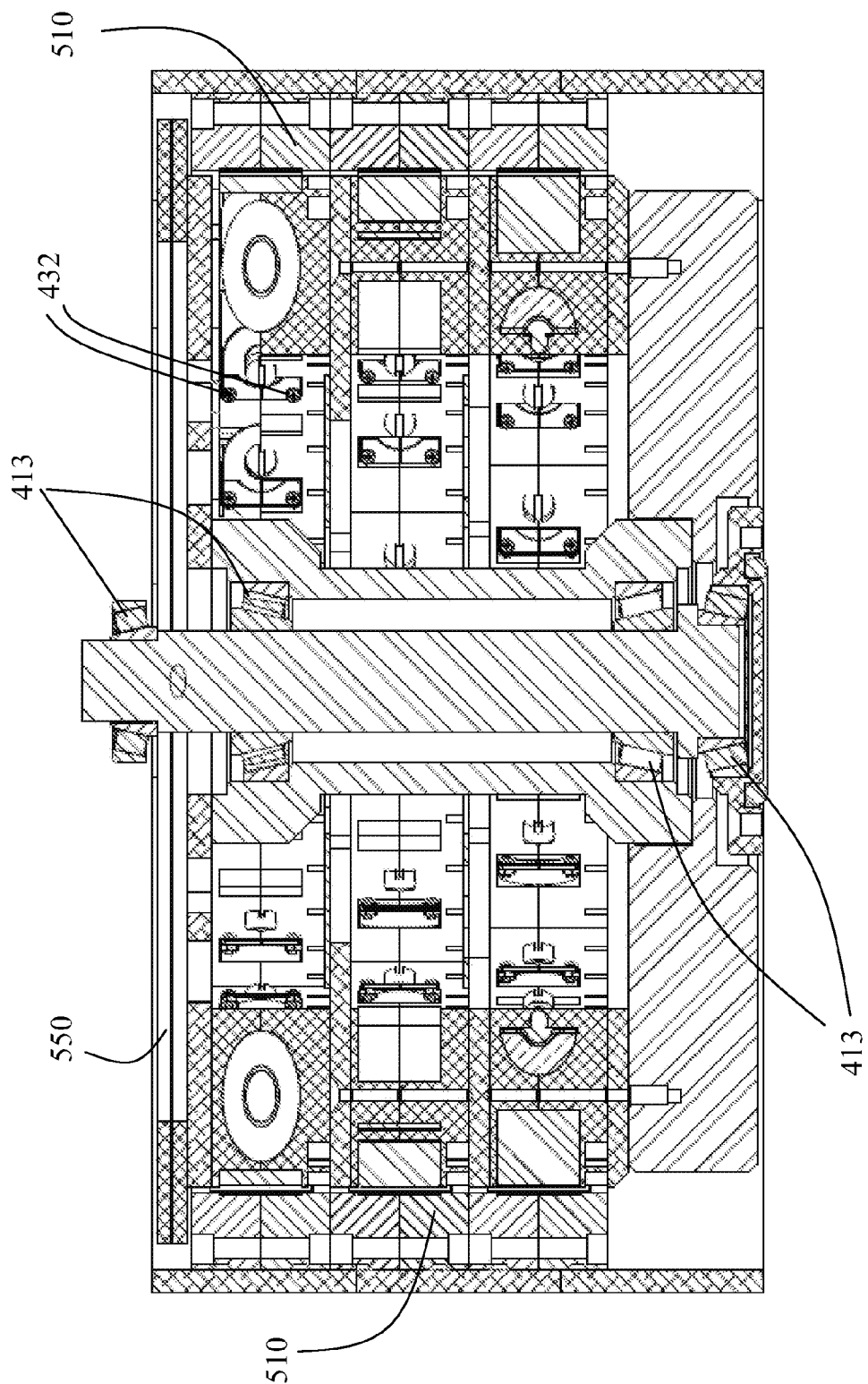
FIG. 7 is a side cross sectional view of a turbine according to certain embodiments of the invention.
Figure 8:
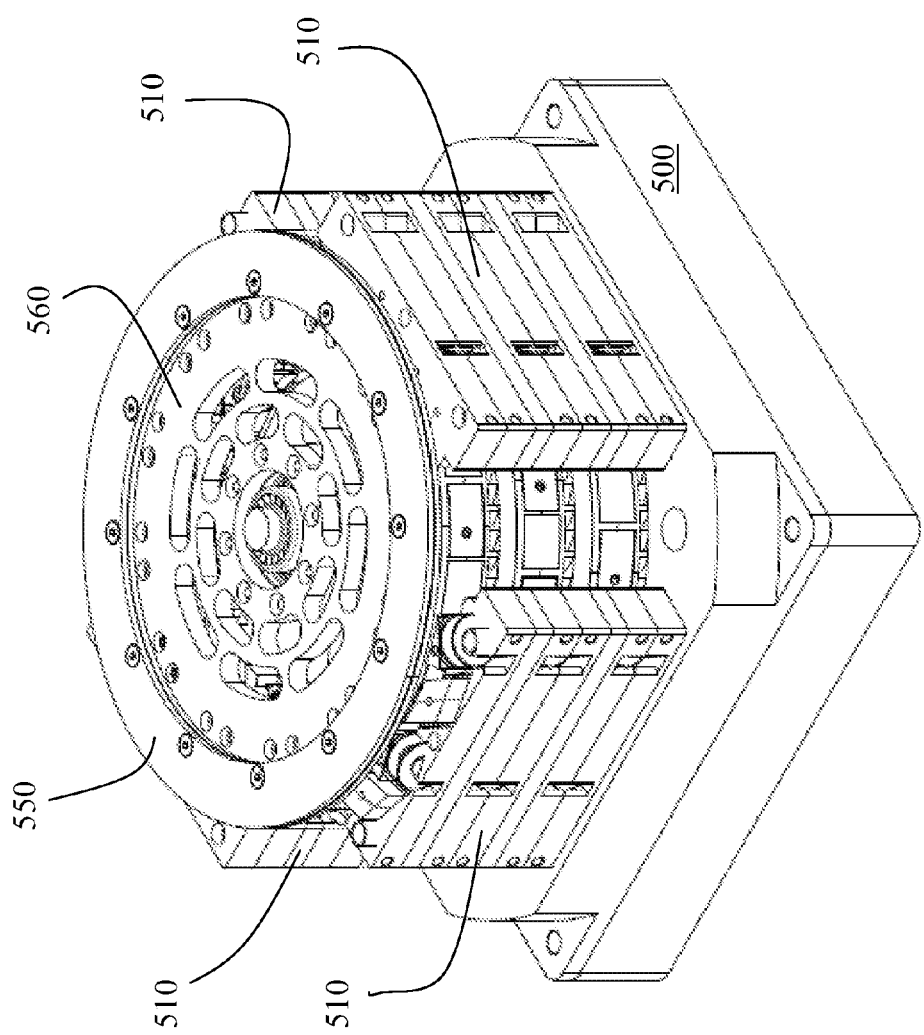
FIG. 8 is a top perspective view of a portion of a turbine according to certain embodiments of the invention.
Figure 8A:
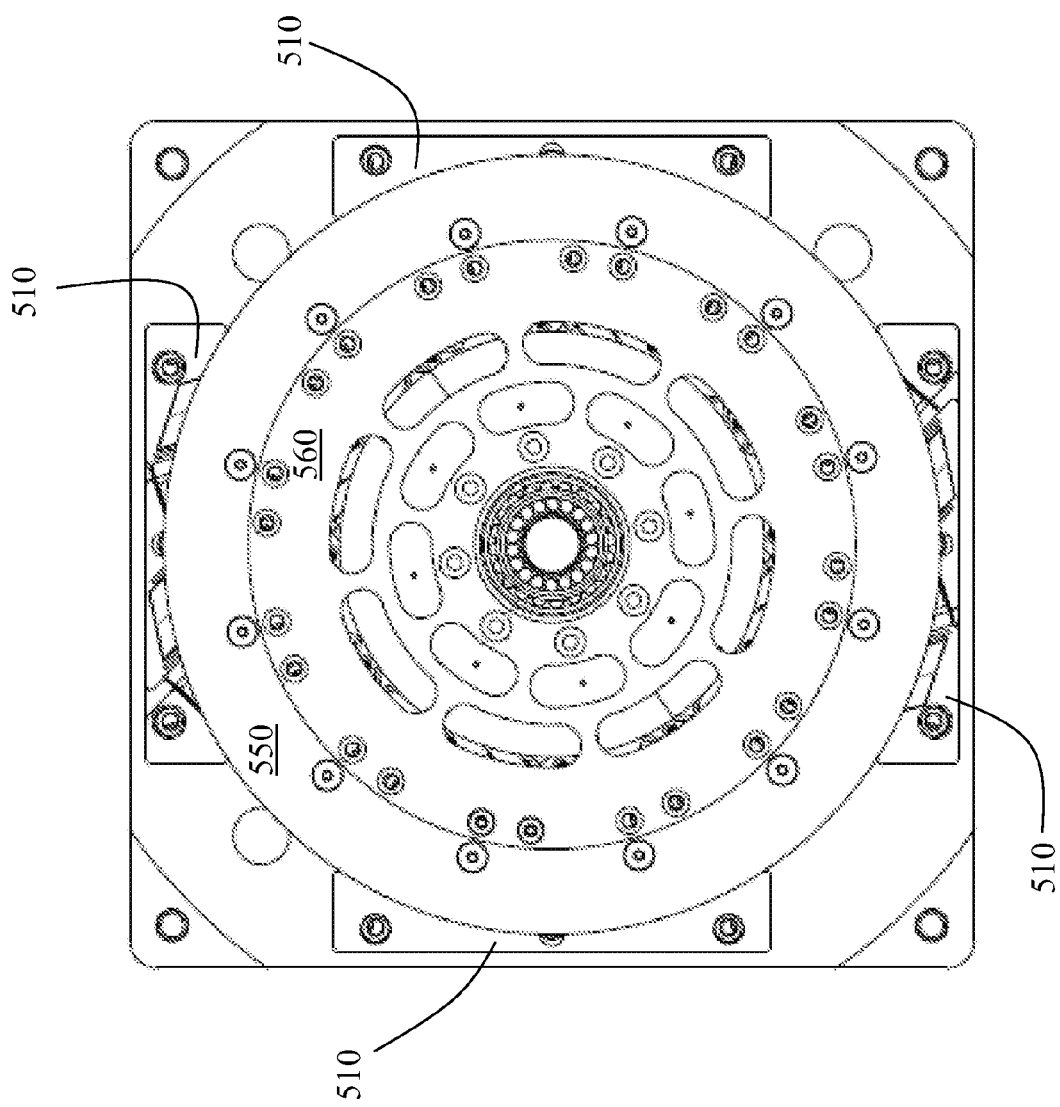
FIG. 8A is a top view of a portion of a turbine according to certain embodiments of the invention.

As shown in FIG. 3 and FIG. 5, for example, the turbine magnet/blade assemblies 410 may be stacked and coupled together using one or more suitable mechanical fasteners, such as screws, and/or adhesives. Holes 416 may be provided through each magnet housing 425 and support member 405 to facilitate coupling of the turbine magnet/blade assemblies 410. The coupled turbine magnet/blade assemblies 410 may also be rotatably attached to the shaft 412 via one or more of the support members 405, as shown in FIG. 6.

The flywheel permanent magnets 420 and flywheel electromagnets 430 may be designed and configured so that they will provide a maximum surface area along an outside edge 422, and correspondingly a maximum magnetic force at that outside edge 422. As illustrated in FIGS. 3 and 5, the outer edge 422 of the flywheel permanent magnets 420 and flywheel electromagnets 430 are preferably curved and conform to the shape of the turbine magnet/blade assembly 410. The coil portion of each flywheel electromagnet 430 can be angled within the magnet housing 425 as illustrated in FIG. 5 to allow for the use of larger electromagnets and to maximize the number of flywheel electromagnets 430 and flywheel permanent magnets 420 that can be arranged within the magnet housing 425.

Each flywheel permanent magnet 420 can be shaped so that, when installed in the magnet housing 425, it is narrower on an outside edge 422 of the magnet than on the inside edge 424 (see FIG. 5). The spaces in the magnet housing 425 for receiving the flywheel permanent magnets 420 may be sized and shaped in a corresponding manner, such that the wider edge of the flywheel permanent magnet 420 would not fit through the narrower part of the space. This configuration minimizes the risk that a flywheel permanent magnet 420 will be ejected from the magnet housing 425 during operation of the turbine 300, i.e., when the permanent magnets 420 rotating at high speeds interact with the magnet assemblies 510 positioned in the turbine casing 500. Similarly, the spaces in the magnet housing 425 for receiving the flywheel electromagnets 430 can be shaped to correspond with the shapes of the flywheel electromagnets 430 and configured with various types of physical stops for keeping the flywheel electromagnets 430 in place during operation of the turbine 300.

In a typical configuration, the flywheel permanent magnets 420 are axially magnetized and are arranged on the turbine magnet/blade assembly 410 so that the same pole of each magnet faces outward. In some embodiments, the north pole of each of the flywheel permanent magnets 420 faces outward (away from the shaft 412). The flywheel permanent magnets 420 are preferably formed of neodymium or other similar magnetic material with a similar magnetic strength. In some embodiments, the flywheel permanent magnets 420 are formed of N52 neodymium, which is the highest grade of neodymium magnet currently available. The fly wheel electromagnets 430 may be constructed from mild steel and copper coil, or any other suitable materials.

Each flywheel electromagnet 430 can be wired at its inside edge 432 to an electromagnet controller 440 (see FIG. 4), which is mounted on one of the support members 405 of a turbine magnet/blade assembly 410. The electromagnet controller 440 is preferably itself a printed circuit board ("PCB"), but could also be another suitable structure with one or more PCB mounted thereon. The electromagnet controller 440 activates/deactivates the flywheel electromagnets 430 and selectively changes their polarity.

As explained in further detail below, in some embodiments the electromagnet controller 440 is controlled by a CPU 445, which may be mounted on a support member 405 of another of the turbine magnet/blade assemblies 410. The connection between the electromagnet controller 440 and the CPU 445 can be wired or wireless. The CPU 445 thus sends signals to the electromagnet controller 440, which cause the electromagnet controller 440 to activate/deactivate and change the polarity of the flywheel electromagnets 430.

The CPU 445 can in turn be controlled by an external control computer 250 via a wireless link, as shown in FIG. 1. The CPU 445 and electromagnet controller 440 can be powered by a battery or bank of batteries (not shown), which may be mounted to a battery board. For example, the battery board may be mounted to a support member 405 of another of the turbine magnet/blade assemblies 410. Alternatively or additionally, batteries may be positioned within various spaces 427 formed in the magnet housing 425. In some embodiments, the batteries used to power the CPU 445 and electromagnet controller 440 are rechargeable lithium-ion batteries. Other types of rechargeable batteries may also be used.

Where more than one turbine magnet/blade assembly 410 is mounted to the shaft 412, the turbine magnet/blade assemblies 410 may be aligned such that the flywheel permanent magnets 420 of one turbine magnet/blade assembly 410 are offset relative to the flywheel permanent magnets 420 on the adjacent turbine magnet/blade assembly 410 (and thus the flywheel electromagnets 430 of the one turbine magnet/blade assembly 410 are offset relative to the flywheel electromagnets 430 on the adjacent turbine magnet/blade assembly 410), as shown in FIG. 3 and FIG. 5. This configuration allows for smoother control of the turbine flywheel assemblies 410, and thus more consistent/smoother power generation in the generator 600.

As shown in FIGS. 5A through FIG. 9, the turbine casing 500 includes one or more casing magnet assemblies 510. In the illustrated embodiments, the turbine casing 500 includes four casing magnet assemblies 510 arranged around the inside surface of the turbine casing 500, facing the turbine magnet/blade assemblies 410. Each casing magnet assembly 510 may be curved to conform to the curvature of the one or more turbine magnet/blade assemblies 410. Each casing magnet assembly 510 may include one or more casing permanent magnets 512 and/or one or more casing electromagnets 514. In the illustrated embodiments, casing magnet assembly 510 includes alternating columns of casing permanent magnets 512 and casing electromagnets 514.

The casing permanent magnets 512 and casing electromagnets 514 operate in a similar manner as the flywheel permanent magnets 420 and flywheel electromagnets 430, as described herein. Power for the casing electromagnets 514 may be drawn from external batteries 255 or another external power source (see FIG. 1), as will be described below. The external control computer 250 may include circuitry and logic for activating/deactivating and changing the polarity of the casing electromagnets 514. Each casing permanent magnet 512 and casing electromagnet 514 may be diametrically magnetized and arranged such that a vertical half of the surface that faces inward (i.e., towards the turbine magnet/blade assemblies 410) has a north polarity and the other vertical half of the surface has a south polarity. The casing permanent magnets 512 are preferably formed of neodymium or other similar magnetic material with a similar magnetic strength. In some embodiments, the casing permanent magnets 512 are formed of N52 neodymium.

As discussed above, rotation of the turbine flywheel assembly 400 is effectuated at least in part by compressed air injected into the turbine 300 through one or more nozzles 150. The external control computer 250 is connected to the nozzles (at least indirectly) and controls amount and timing of the compressed air injected onto the turbine blades 415. The force applied to the turbine blades 415 by the compressed air causes the turbine magnet/blade assemblies 410 (and thus the turbine flywheel 414) to rotate about the shaft 412.

In conjunction with the injection of compressed air, as necessary to provide additional torque to the turbine flywheel assembly 400, the flywheel electromagnets 430 and the casing electromagnets 514 are activated/deactivated/polarity switched in a controlled sequence. For example, as each flywheel electromagnet 430 approaches a casing permanent magnet 512, the flywheel electromagnet 430 is activated and its polarity is set such that it is attracted to the casing permanent magnet 512. As soon as the flywheel electromagnet 430 rotates past the center point of the casing permanent magnet 512, the polarity of the flywheel electromagnet 430 is reversed so that it is repelled by the casing permanent magnet 512. Similarly, as each flywheel permanent magnet 420 approaches a casing electromagnet magnet 514, the casing electro magnet 514 is activated and its polarity is set such that the flywheel permanent magnet 420 is attracted to it. As soon as the flywheel permanent magnet 420 rotates past the center point of the casing electromagnet 514, the polarity of the casing electromagnet 514 is reversed so that the flywheel permanent magnet 420 is repelled by the casing electro magnet 514. Accordingly, changing the polarity of the flywheel electromagnets 430 and/or the casing electromagnets 514 controls the speed of the magnet motor. The external control computer 250 is thus in communication with the flywheel electromagnets 430 and/or the casing electromagnets 514 of the magnet motor for selectably controlling its rotational speed.

In some embodiments, the flywheel electromagnets 430 and the casing electromagnets 514 may also be polarity switched relative to each other. In other words, as each flywheel electromagnet 430 approaches a casing electromagnet 514, the casing electromagnet 514 and the flywheel electromagnet 430 can both be activated and their polarities can be set such that the flywheel electromagnet 430 is attracted to the casing electromagnet magnet 514. As soon as the flywheel electromagnet 430 rotates past the center point of the casing electromagnet 514, the polarity of the flywheel electromagnet 430 (or the casing electromagnet 514) can be reversed so that that flywheel electromagnet 430 is repelled by the casing electromagnet 514.

The flywheel electromagnets 430 and the casing electromagnets 514 may also be deactivated at selected times, which causes them to function as electric generators and accumulate small charges. For example, each flywheel electromagnet 430 (rotating around the shaft 412) may be deactivated for at least a portion of the time (which may be a fraction of a second) that it passes the space between a casing permanent magnet 512 and a casing electromagnet 514. Similarly, each casing electromagnet 514 may be deactivated for at least a portion of the time that it is passed by the space on a turbine magnet/blade assembly 410 between a flywheel permanent magnet 420 and a flywheel electromagnet 430. In other embodiments, one or more of the flywheel electromagnets 430 may be deactivated for at least a portion of the time that it passes a casing electromagnet 514, or one or more of the casing electromagnets 514 may be deactivated for at least a portion of the time that it is passed by a flywheel electromagnet 430. The small electric charges (pulses) generated by the flywheel electromagnets 430 can be used to trickle charge the batteries (mounted on the turbine flywheel assembly 400) that power the CPU 445, the electromagnet controller 440 and the flywheel electromagnets 430. The pulses generated by the casing electromagnets 514 can be used to trickle charge the external batteries 225 that power the casing electromagnets 415 and other components (as discussed below).

Figure 5A:
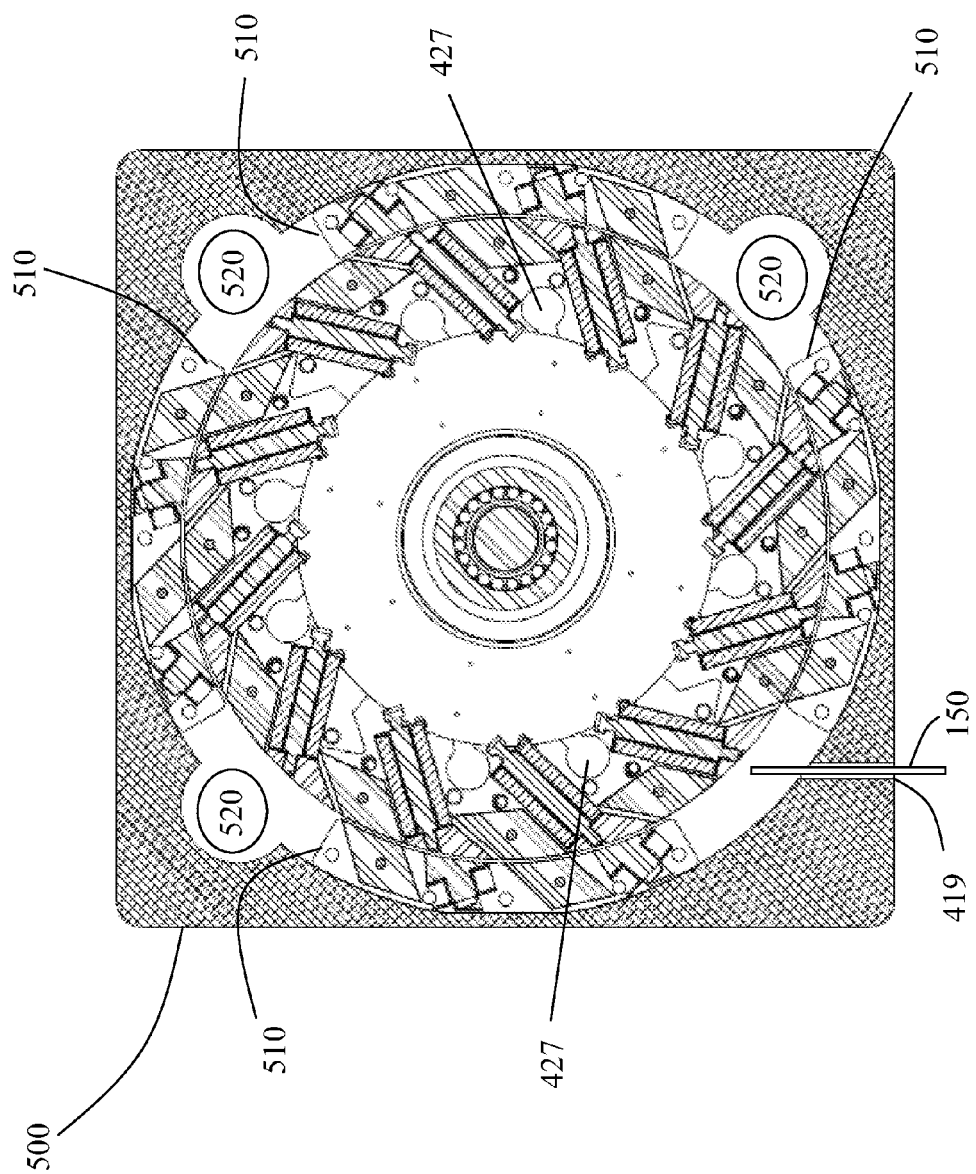
FIG. 5A is a bottom cross sectional view of a turbine according to certain embodiments of the invention.
Figure 5B:
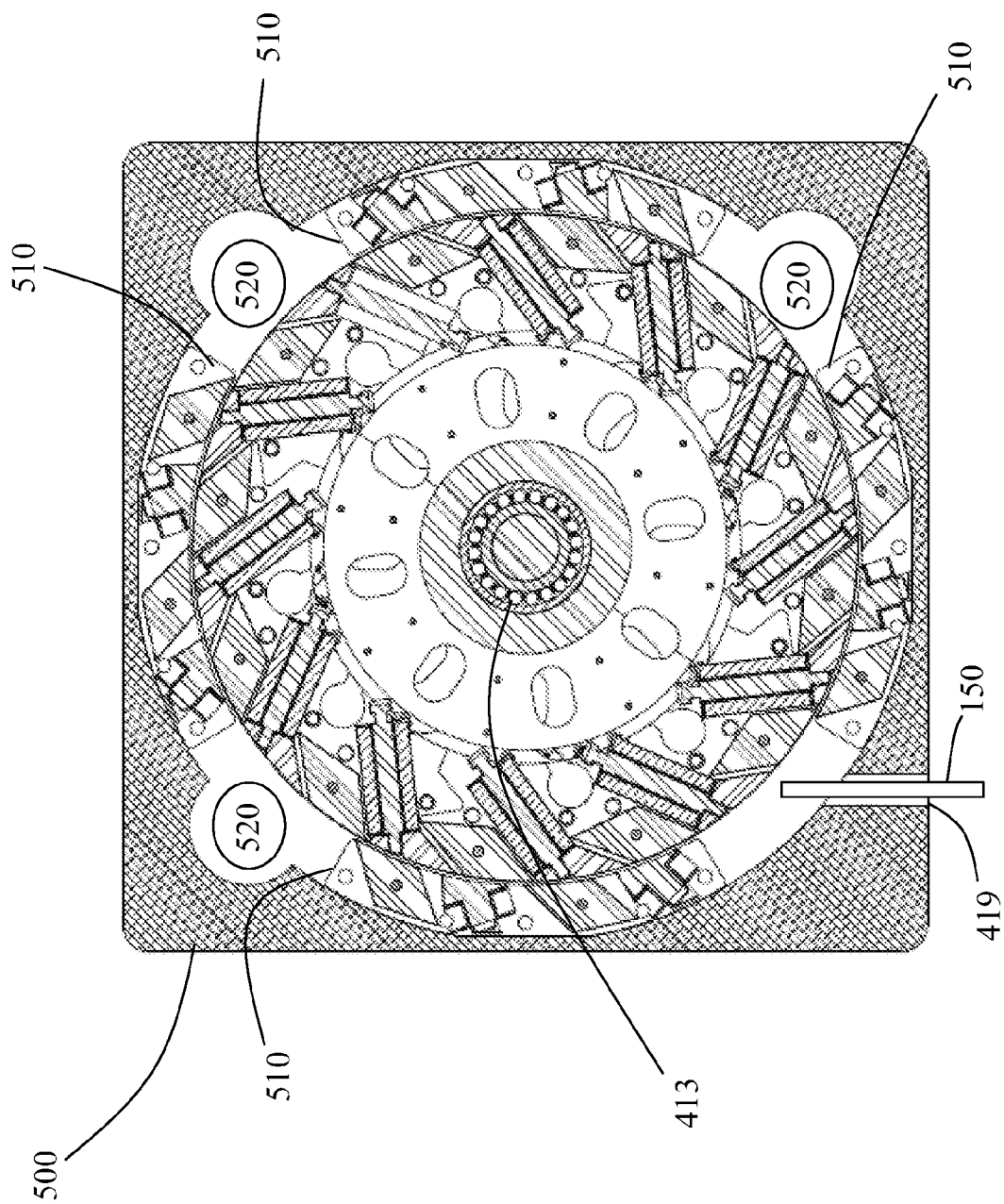
FIG. 5B is a top cross sectional view of a turbine according to certain embodiments of the invention.
Figure 10:
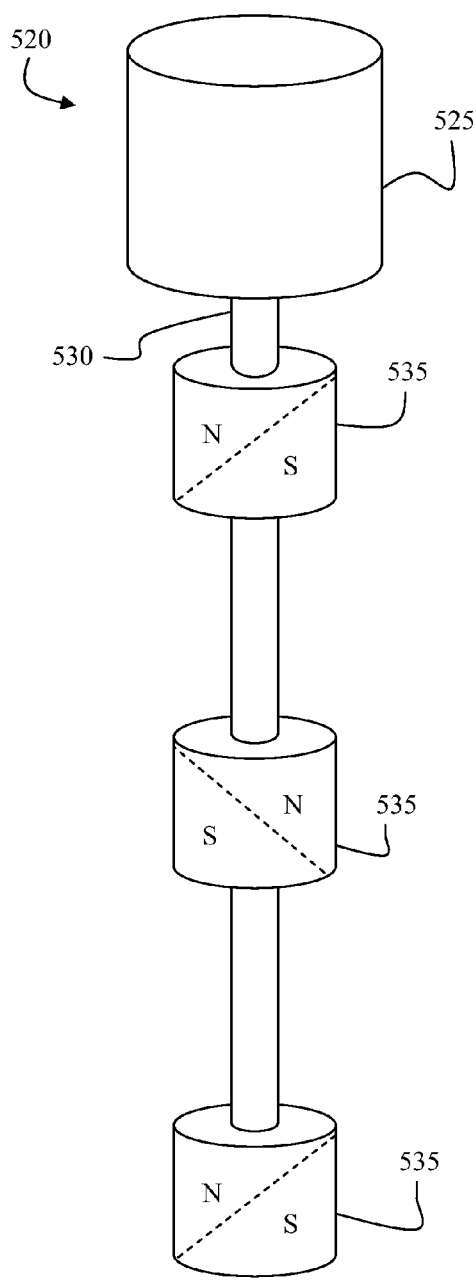
FIG. 10 is a top perspective view of a stepper motor according to certain embodiments of the invention.

As shown in FIGS. 5A, 5B, the turbine casing 500 also includes satellite magnet assemblies 520 in at least three corners. Each satellite magnet assembly 520 is positioned between two sets of casing magnet assemblies 510. As shown in FIG. 10, an exemplary satellite magnet assembly 520 includes a motor 525 (e.g., a stepper motor) for rotating a motor shaft 530. The motor 525 is connected to and controlled by the external control computer 250 and is powered by the external battery (or another suitable external power source). The external control computer 250 activates/deactivates the motor 525 and also selectively controls its rotational speed.

Figure 10A:
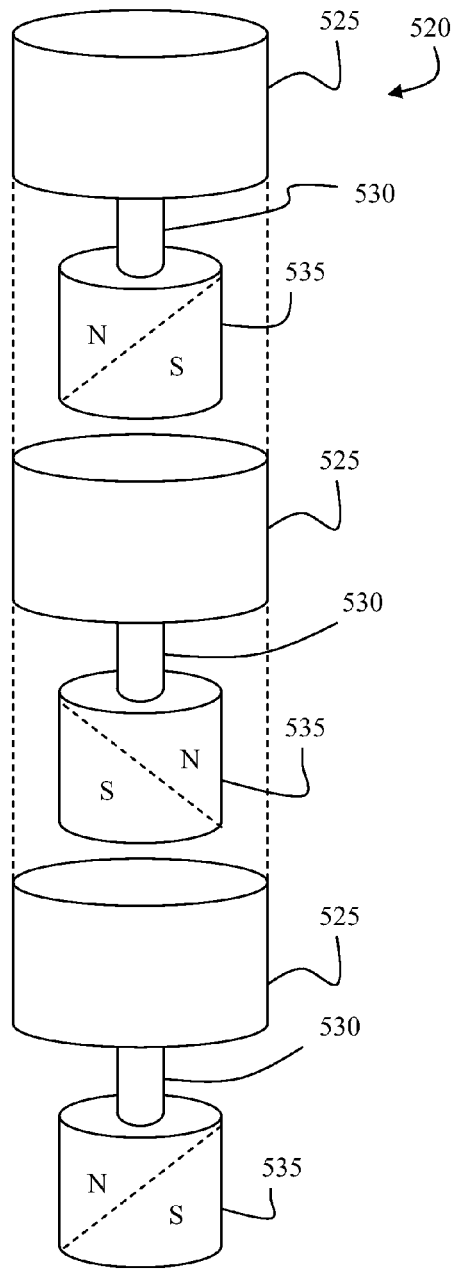
FIG. 10A is a top perspective view of a stepper motor according to certain alternate embodiments of the invention.
Figure 11:
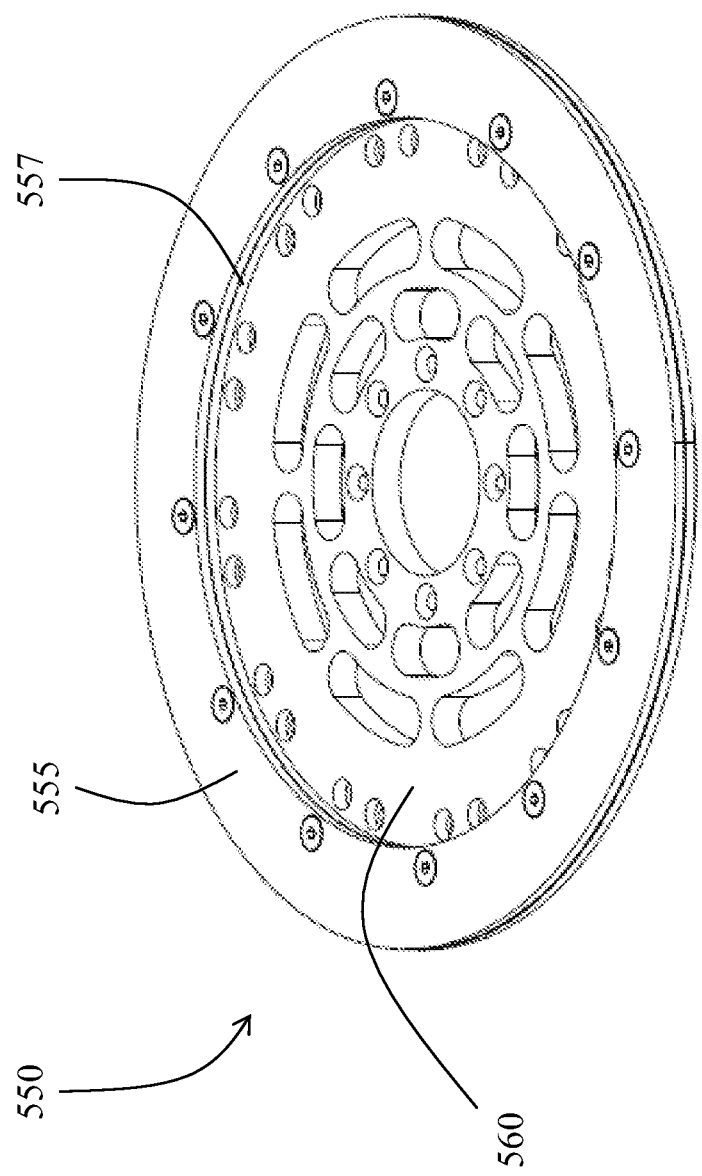
FIG. 11 is a top perspective view of a optical disc assembly according to one certain embodiments of the invention.

One or more satellite magnets 535 are mounted on the motor shaft 530; the number of satellite magnets corresponds to the number of turbine magnet/blade assemblies 410 (i.e., 3 in the illustrated embodiments, but could also be multiples thereof). The satellite magnets 535 are diametrically magnetized and arranged on the motor shaft 530 with respect to each other with alternating poles. The poles of the satellite magnets 535 are aligned along the diagonal in the illustrated embodiment, though other arrangements are possible. When the motor 525 is activated, the motor shaft 530 and the satellite magnets 535 rotate. The rotating north-south poles of the satellite magnets 535 interact with the flywheel permanent magnets 420 (and, in some embodiments, the flywheel electromagnets 430) on the corresponding turbine magnet/blade assemblies 410 to create an alternating push-pull effect. In other embodiments, one motor 525 may be provided per satellite magnet 535, as shown in FIG. 10A

The satellite magnet assemblies 520 can thus impart additional torque to the magnet motor, which can be used to selectively assist in maintaining and/or increasing the rotational speed of the turbine flywheel 414 as it rotates about the shaft 412. In some embodiments, the satellite magnet assemblies 520 will be activated only for a short period of time after a load (or increased load) is added to the system. During steady state operation of the system, the satellite magnet assemblies 520 may be deactivated to reduce the amount of electrical power needed to operate the turbine 300.

In some embodiments, it may be desirable to include a further source of torque to the turbine flywheel assembly 400. Additional torque may be desirable, for example, upon initial startup of the turbine 300 (or whenever an increased load is applied) in order to conserve compressed air and increase the rate at which the turbine flywheel 400 is spinning. An exemplary source of torque could be a high-torque motor 580, such as a DC "pancake" motor (See, e.g., FIG. 12). In one embodiment, the high-torque motor 580 is a brushless motor that operates on the Perendev principle, with axially magnetized permanent magnets aligned in the same direction on an assembly located on the turbine flywheel assembly 400 and diametrically magnetized electromagnets located on the turbine casing 500. In this configuration, the permanent magnets rotate around the plurality of stationary electromagnets. The voltage of the diametrically magnetized electromagnets on the turbine casing 500 is varied to increase the magnetic attraction and repulsion of the axially magnetized permanent magnets on the turbine flywheel assembly 400, which provides additional torque to the turbine flywheel assembly 400. A brushless motor may be preferable to minimize arching which could be harmful for the electronic components in the system. The high-torque motor 580 (i.e., the electromagnets thereof, in the case of the described pancake motor) may be connected to and controlled by the external control computer 250 and powered by the external batteries 255. The external control computer 250 is thus in communication with the high-torque motor for selectably controlling its rotational speed.

In certain embodiments, it may be desirable to preheat and/or pre-charge the compressed air that is provided to the turbine 300 via the nozzles 150. Hot air has a higher energy value than colder air, and can thus increase the efficiency of the turbine 300. Likewise, electrostaticly charged air will form an electrostatic bond with the oppositely charged turbine blades 415, which will produce an electrostatic "Tsunami" effect on the turbine flywheel assembly 400. An electrostatic charger 209 (see FIG. 1) may be added to the compressed air delivery system, (either before the nozzles 150 as shown, or after the nozzles 150) to accomplish this pre-charging, i.e., to charge the compressed air particles with very high electrostatic voltage. Exemplary methods for pre-heating the compressed air provided to the turbine 300 are described below.

Figure 12:
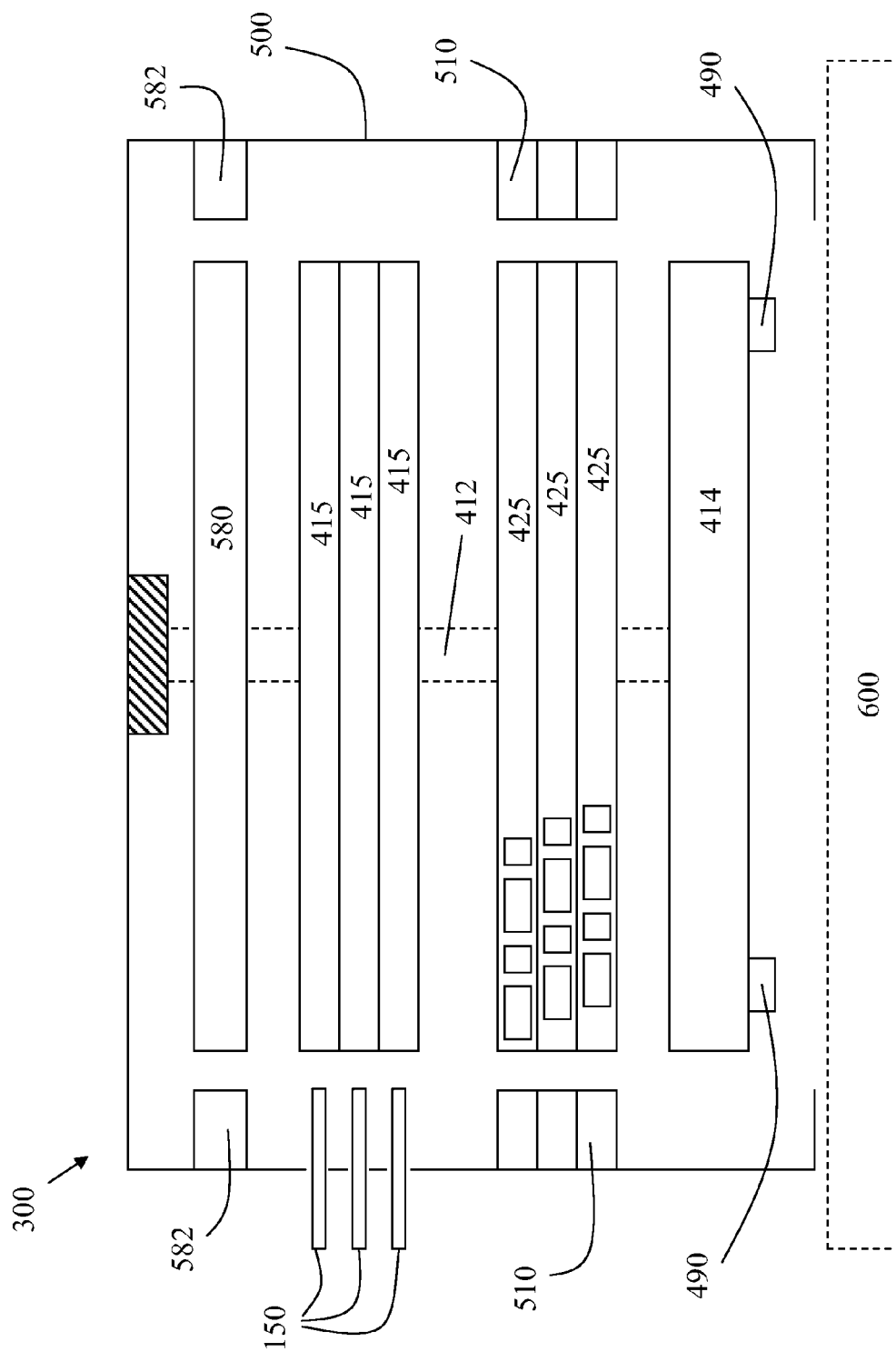
FIG. 12 is a side view of a turbine according to certain alternate embodiments of the invention.
Figure 13:
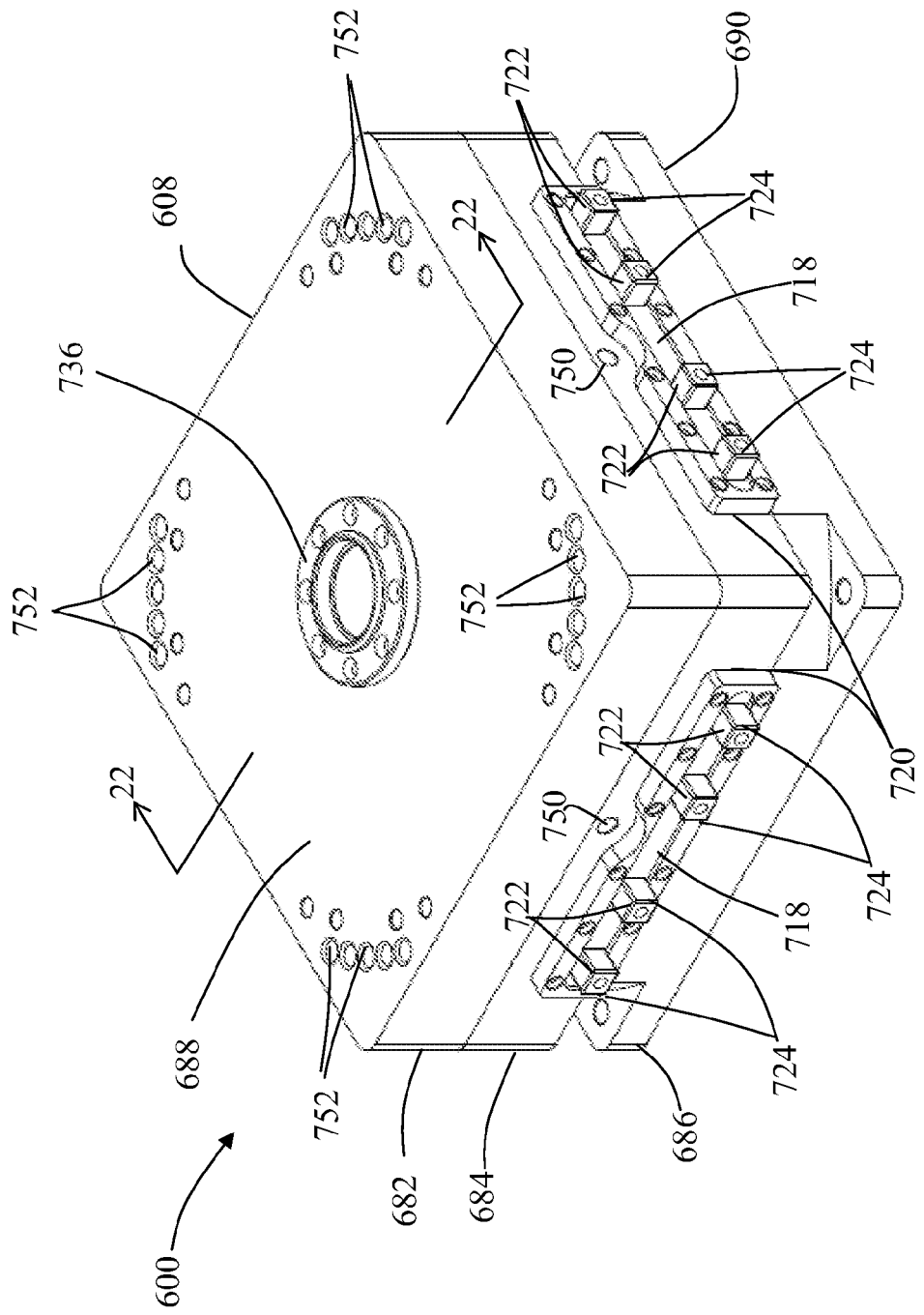
FIG. 13 is a perspective view of a generator according to certain embodiments of the invention.
Figure 14:
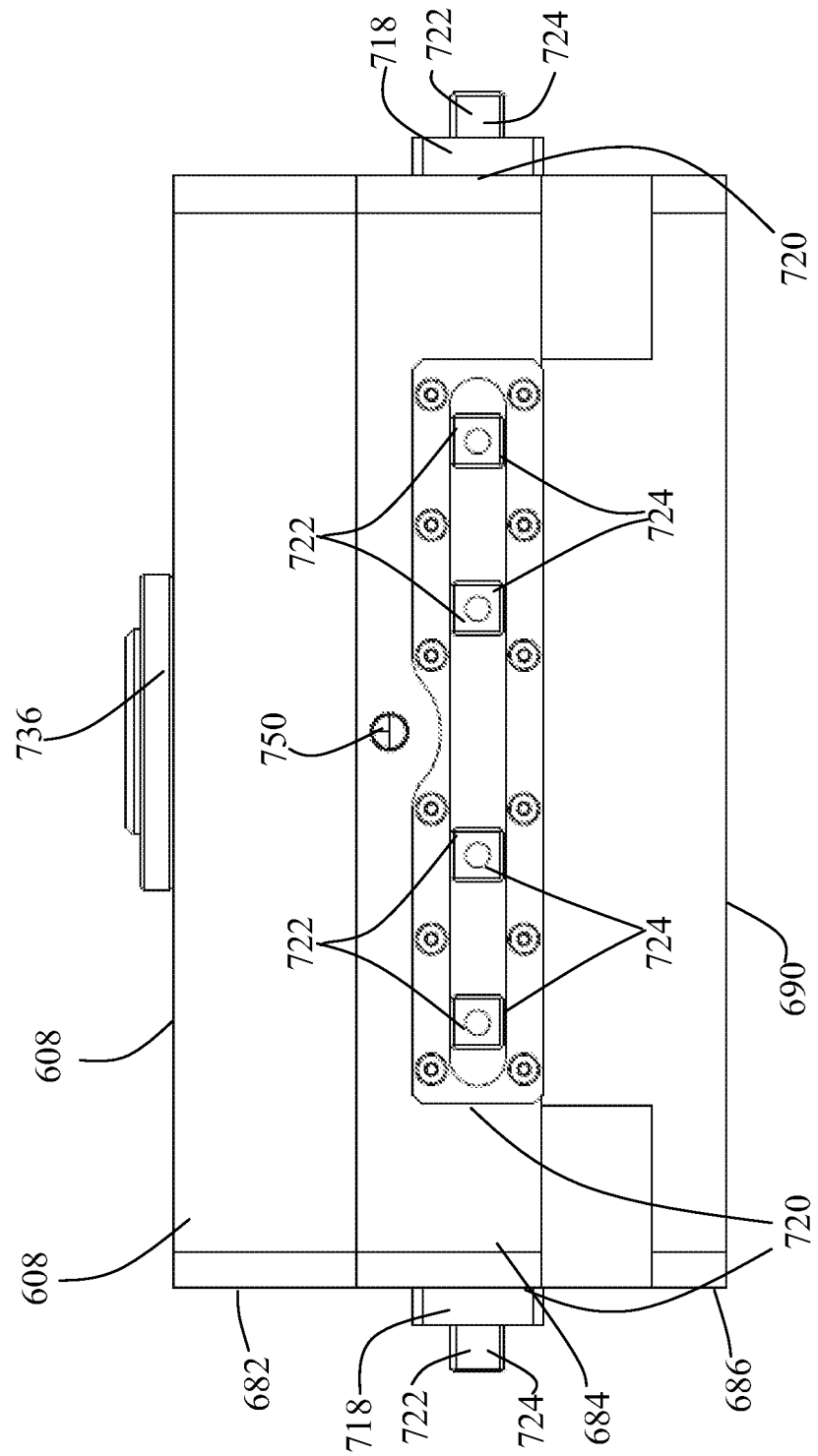
FIG. 14 is a front view of the generator of FIG. 13.

While preheated air may be desirable in some embodiments, it is not without its drawbacks. In particular, the electronic components and/or magnets in the turbine 300 may be adversely impacted by high temperatures. Accordingly, it may be desirable to de-couple the turbine blades 415 from the electronic components and/or magnets in the turbine 300. An example of how this may be accomplished is to decouple the turbine blades 415 from the magnet housings 425, as shown in FIG. 12. In the illustrated embodiment, a series of turbine blades 415 are grouped together on the shaft 412 just below the pancake motor 580. The magnet housings 425 are grouped together on the shaft 412 below the turbine blades 415. A support members 405 is mounted on top of each magnet housing 425, as previously described, with the electromagnet controller 440, CPU 445, and battery board each mounted on one of the support members 405. The vertical arrangement and spacing of the components shown in FIG. 12 is provided by way of example only. In other similar embodiment, the turbine blades 415, magnet housings 425 and pancake motor 580 could be arranged in a different order (e.g., turbine blades 415 at top of shaft 412, with pancake motor 580 between the turbine blades 415 and the magnet housings 425, etc.).

In the embodiment illustrated in FIG. 12, it will be apparent that the shaft 412 may be suspended from the top of the turbine casing 500 (e.g., using a single set of nested bearings 413). A benefit of such a configuration is that the bottom of the turbine casing 500 may be eliminated, which reduces the overall weight of the turbine 300 and reduces the potential for magnetic interference between the turbine clutch magnets 490 and generator clutch magnets 610, resulting in a stronger magnetic coupling between the turbine flywheel 414 and the upper generator flywheel 602.

In order to precisely control the rotational speed of the turbine flywheel assembly 400, it is necessary for the external control computer 250 to precisely track the rotational position of the turbine flywheel assembly 400 relative to the generator casing 500 in real time. For example, the external control computer 250 will need to know (or be provided with data for calculating) the position of each of the flywheel electromagnets 430 and the permanent magnets 420 relative to the casing electromagnets 514 and the casing permanent magnets 512, so that the exact times for activating/deactivating/polarity switching the flywheel electromagnets 430 and the casing electromagnets 514 can be determined. Similarly, the external control computer 250 will need to know (or be provided with data for calculating) the position of each turbine blade 415 relative to the nozzles 150, so that exact times for opening/closing the nozzles 150 can be determined. The external control computer 250 can also be configured to determine, or may be provided with data indicating, the rotational speed of the turbine flywheel assembly 400 based on detected changes in its rotational position. Based on the rotational speed of the turbine flywheel assembly 400, the external control computer 250 can determine when to activate/deactivate and/or vary the speed of the satellite magnet assemblies 520 and the high-torque motor 580.

In some embodiments, the absolute position of the turbine magnet/blade assemblies 410 can be tracked with extreme precision using an absolute position magnetic encoder chip (not illustrated). An exemplary magnetic encoder chip is the AM4096 chip, available from RLS®. Within the miniature chip is the processing circuitry to provide outputs in absolute SSI, incremental, linear voltage, tacho and UVW formats with resolutions to 12 bit. The zero position can also be selected at point of installation. The encoder integrated circuit senses the position of a diametrically polarized magnet that rotates proximate to the chip. As the magnet rotates an array of Hall sensors within the chip produces a voltage representation of the magnetic field distribution. Subsequent internal processing is then used to produce the required output signal format and resolution. In some embodiments, one of the magnetic encoder chip and the diametrically polarized magnet is mounted to the flywheel assembly 400 (e.g., above the shaft 412) and the other is mounted to the turbine casing 500, such that the one rotates relative to the other. The magnetic encoder chip can be connected to the external control computer 250 to provide positional data and/or rotational speed data to the external control computer 250.

In other embodiments, precise positional tracking of the turbine flywheel assembly 400 could be achieved using an absolute position encoder (e.g., the HD25A encoder, available from U.S. Digital). In still other embodiments, precise positional tracking of the turbine flywheel assembly 400 could be achieved using an optical reader assembly. With reference to FIGS. 6, 7, 8, 8A and 11, one such optical reader assembly 550 includes a filament-coated optical disc 555 mounted on a substrate 560. The substrate 560 is attached to the shaft 412 of the turbine flywheel assembly 400. In one embodiment, the filament-coated optical disc 555 is protected by one or more clear acrylic sheets 557. As the turbine flywheel assembly 400 rotate within the turbine 300, an optical reader (not illustrated) attached to the turbine casing 500 can track the location and speed of the turbine flywheel assembly 400 based on the movement of the optical disc 555 past the optical reader. The optical reader or absolute position encoder can be connected to the external control computer 250 and powered by the external batteries 255.

Generator

An exemplary generator 600 is shown in FIGS. 13-34. As shown in FIGS. 22-26, the generator 600 includes an upper generator flywheel 602, a lower generator flywheel 604, a generator shaft 606, and a generator casing 608. The upper generator flywheel 602 has a substantially circular shape. The upper generator flywheel 602 may be formed of materials including but not limited to polypropylene, aluminum, ABS, ABS+, polylactic acid, mild steel (such as A36 mild steel), and acetal (such as Delrin®). In one embodiment, the upper generator flywheel 602 is formed from A36 mild steel.

The upper generator flywheel 602 includes a plurality of generator clutch magnets 610 positioned on an outer surface 616. In the embodiment best illustrated in FIGS. 24 and 34, each generator clutch magnet 610 has a circular shape, but one of skill in the art will understand that any suitable shape may be used including but not limited to rectilinear, parabolic, trapezoidal, and oval. The plurality of generator clutch magnets 610 are formed of neodymium or other similar magnetic material with a similar magnetic strength. In some embodiments, the plurality of generator clutch magnets 610 are formed of N42 neodymium.

The plurality of generator clutch magnets 610 may be positioned within a raised ring 618 that is positioned on the outer surface 616. In other embodiments, the plurality of generator clutch magnets 610 may be positioned flush with the outer surface 616. In the embodiment best illustrated in FIGS. 15 and 34, the plurality of generator clutch magnets 610 may be placed within recesses 611 of the raised ring 618. The recesses may be arranged in a consistent pattern around the raised ring 618. The generator clutch magnets 610 may be secured to the raised ring 618 using any suitable adhesive, preferable an adhesive that can withstand the high temperatures that will be present inside the generator 600 during operation.

The generator clutch magnets 610 are arranged so that the same pole of each magnet faces upward. In other words, the plurality of generator clutch magnets 610 are arranged so that the magnet surfaces 614 form an N-N-N-N or an S-S-S-S repeating pattern around the perimeter of the outer surface 616. The plurality of generator clutch magnets 610 are arranged to magnetically attract the similarly arranged turbine clutch magnets 490 located in the turbine flywheel 414 of the turbine flywheel assembly 400. However, one of skill in the relevant art will understand that any appropriate arrangement of the plurality of generator clutch magnets 610 may be used.

Figure 16:
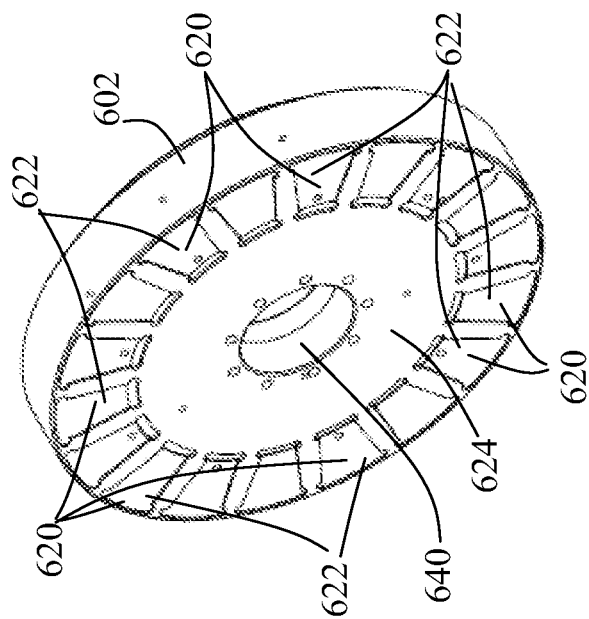
FIG. 16 is a bottom perspective view of the top flywheel of FIG. 15.
Figure 15:
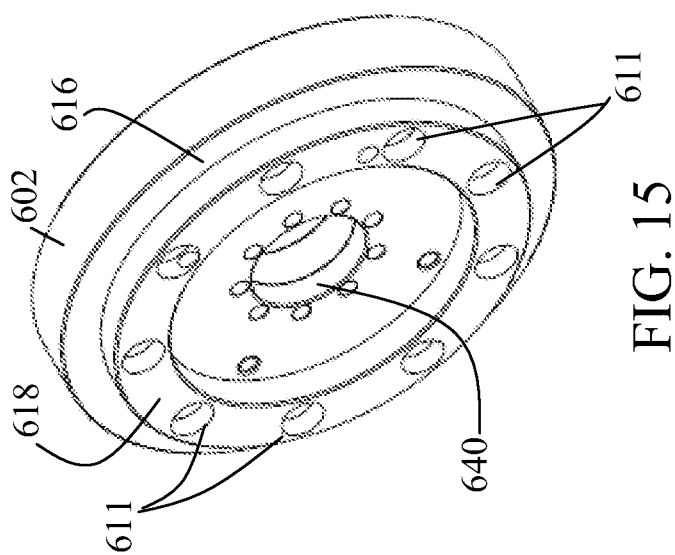
FIG. 15 is a top perspective view of a top flywheel of the generator of FIG. 13.
Figure 18:
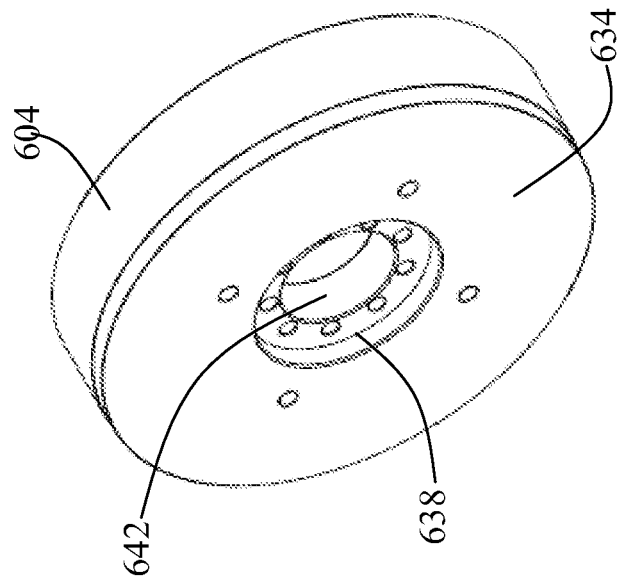
FIG. 18 is a bottom perspective view of the bottom flywheel of FIG. 17.

In the embodiment best illustrated in FIG. 16, the upper generator flywheel 602 also includes a plurality of generator coupling magnets 620 positioned on an inner surface 624. In some embodiments, such as the example illustrated in FIG. 16, the each generator coupling magnet 620 has a trapezoidal shape, but one of skill in the relevant art will understand that any suitable shape may be used including but not limited to rectilinear, parabolic, circular, and oval. The plurality of generator coupling magnets 620 are formed of neodymium or other similar magnetic material with a similar magnetic strength. In some embodiments, the plurality of generator coupling magnets 620 are formed of N52 neodymium.

The generator coupling magnets 620 may be secured to the inner surface 624 using any suitable adhesive, preferable a high temperature adhesive. In the embodiment best illustrated in FIG. 16, the plurality of generator coupling magnets 620 are arranged in an alternating pattern on the inner surface 624 so that alternating poles of each magnet face downward. In other words, the plurality of generator coupling magnets 620 are arranged so that the magnet surfaces 622 form an N-S-N-S repeating pattern around the perimeter of the inner surface 624. However, one of skill in the relevant art will understand that any appropriate arrangement of the plurality of generator coupling magnets 620 may be used.

In these embodiments, each generator clutch magnet 610 is positioned on the outer surface 616 so that the pole of each generator clutch magnet 610 that faces downward is opposite the pole of each generator coupling magnet 620 that faces upward so that the magnets will not repel one another through the upper generator flywheel 602. Because the plurality of generator clutch magnets 610 are oriented so that the same pole of each magnet faces upward (N-N-N-N or S-S-S-S) and the plurality of generator coupling magnets 620 are oriented with an alternating polarity pattern (N-S-N-S) around the perimeter of the inner surface 624, the number of generator clutch magnets 610 and generator coupling magnets 620 may be any suitable number, so long as the number of generator clutch magnets 610 is one-half the number of generator coupling magnets 620 in this configuration.

The lower generator flywheel 604 also has a substantially circular shape. The lower generator flywheel 604 may be formed of materials including but not limited to polypropylene, aluminum, ABS, ABS+, polylactic acid, mild steel (such as A36 mild steel), and acetal (such as Delrin®). In one embodiment, the lower generator flywheel 604 is formed from A36 mild steel. In some embodiments, the lower generator flywheel 604 also includes a plurality of generator coupling magnets 626 positioned on an inner surface 632. The generator coupling magnets 620 may be secured to the inner surface 632 using any suitable adhesive, preferable a high temperature adhesive.

Figure 17:
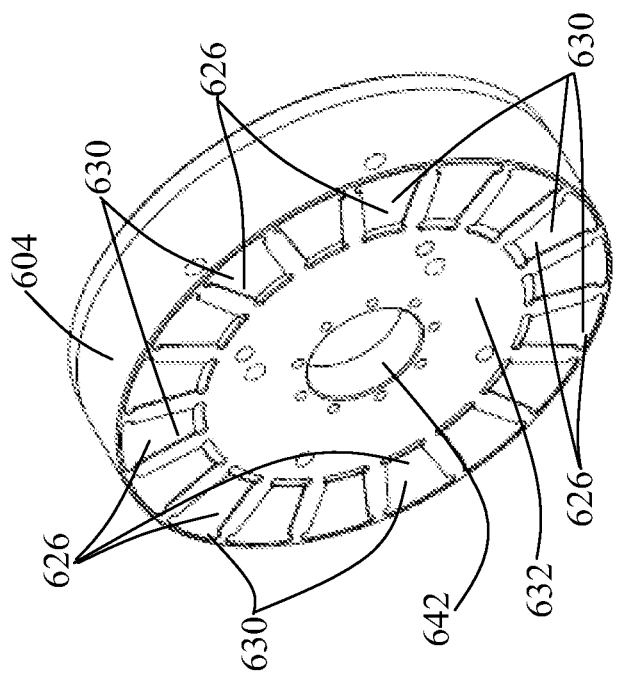
FIG. 17 is a top perspective view of a bottom flywheel of the generator of FIG. 13.
Figure 22:
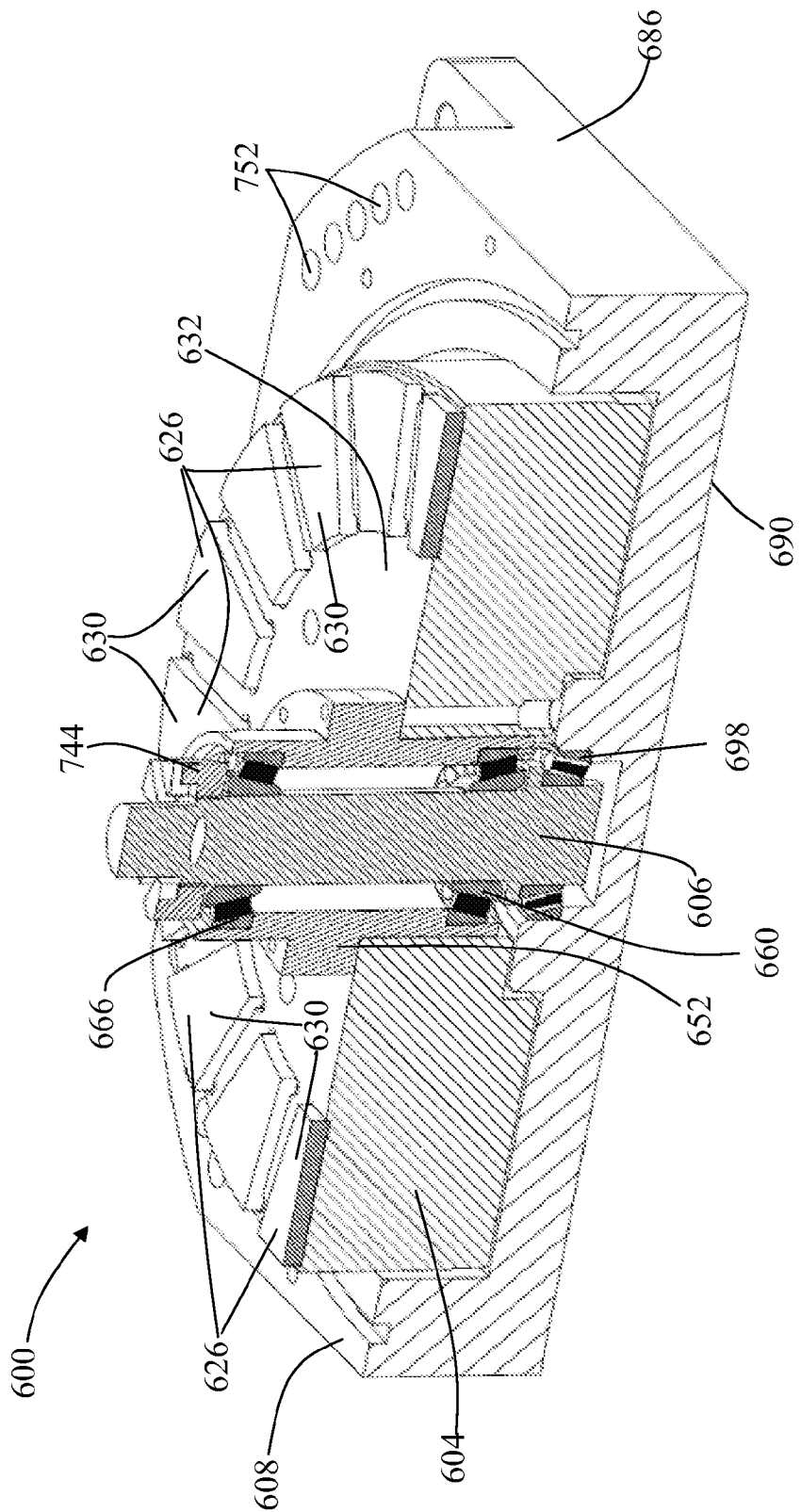
FIG. 22 is a cross-sectional perspective view of the generator of FIG. 13 taken along line 22-22 with the upper and middle sections of the generator casing, the upper flywheel, and the coils removed.
Figure 23:
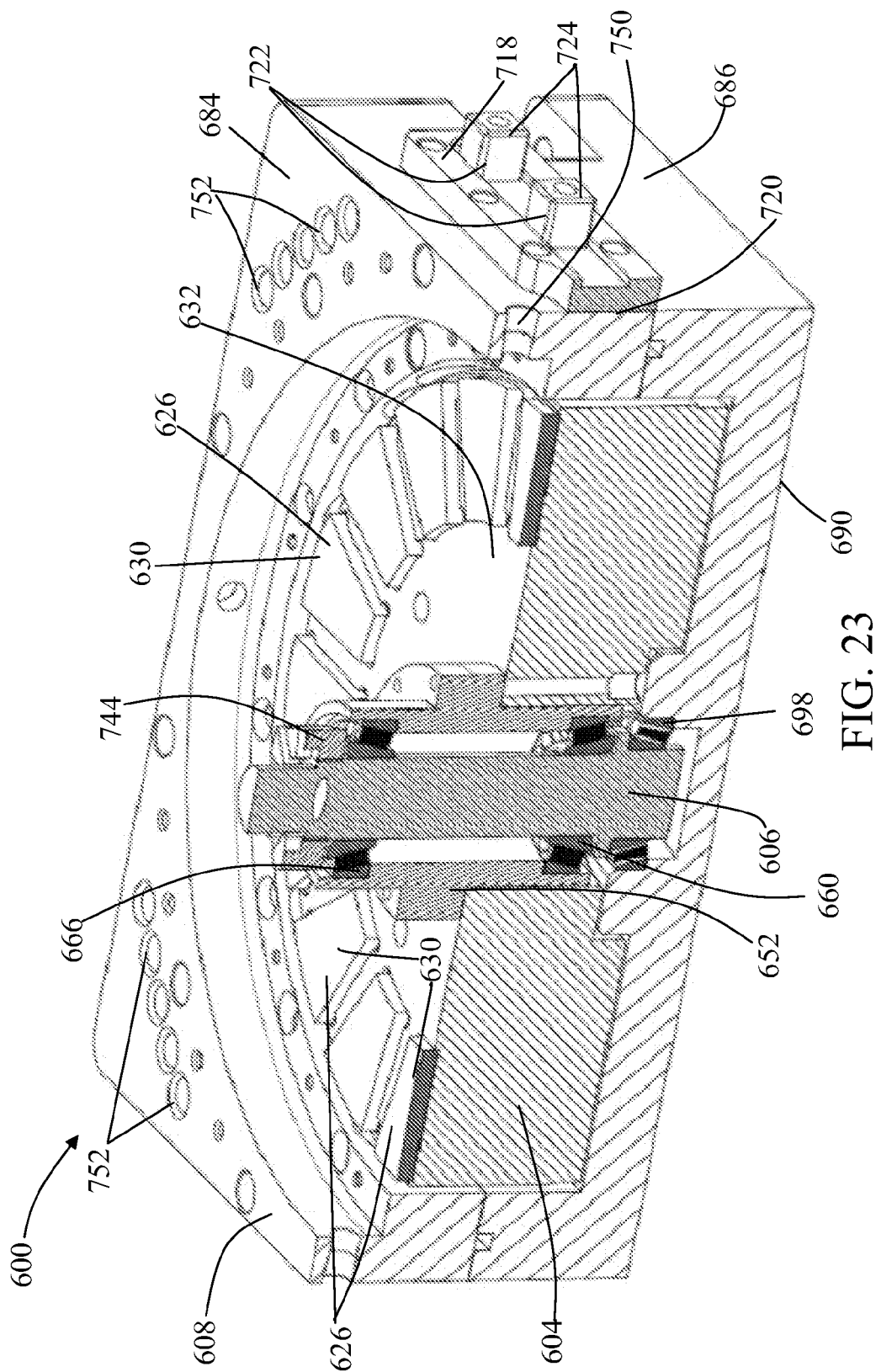
FIG. 23 is a cross-sectional perspective view of the generator of FIG. 13 taken along line 22-22 with the upper section of the generator casing, the upper flywheel, and the coils removed.

In the embodiment best illustrated in FIGS. 17 and 22, each generator coupling magnet 626 on the lower generator flywheel 604 are also trapezoidal in shape, but one of skill in the art will understand that any suitable shape may be used including but not limited to rectilinear, parabolic, circular, and oval. The plurality of generator coupling magnets 626 are formed of neodymium or other similar magnetic material with a similar magnetic strength. In some embodiments, the plurality of generator coupling magnets 626 on the lower generator flywheel 604 are also formed of N52 neodymium.

The plurality of generator coupling magnets 626 on the lower generator flywheel 604 are arranged in an alternating pattern on the inner surface 632 so that alternating poles of each magnet face upward. In other words, the plurality of generator coupling magnets 626 are arranged so that the magnet surfaces 630 form an N-S-N-S repeating pattern around the perimeter of the inner surface 632. In the embodiment best illustrated in FIG. 17, any suitable number of generator coupling magnets 626 may be used on the lower generator flywheel 604, so long as the number matches the number of generator coupling magnets 620 on the upper generator flywheel 602.

Figure 19:
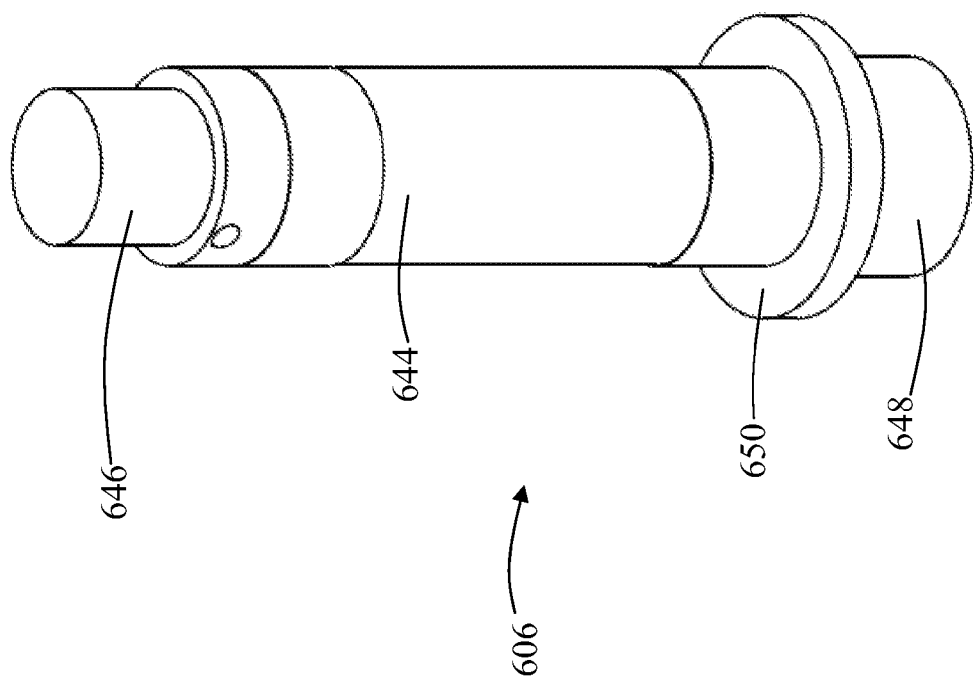
FIG. 19 is a perspective view of a generator shaft of the generator of FIG. 13.
Figure 20:
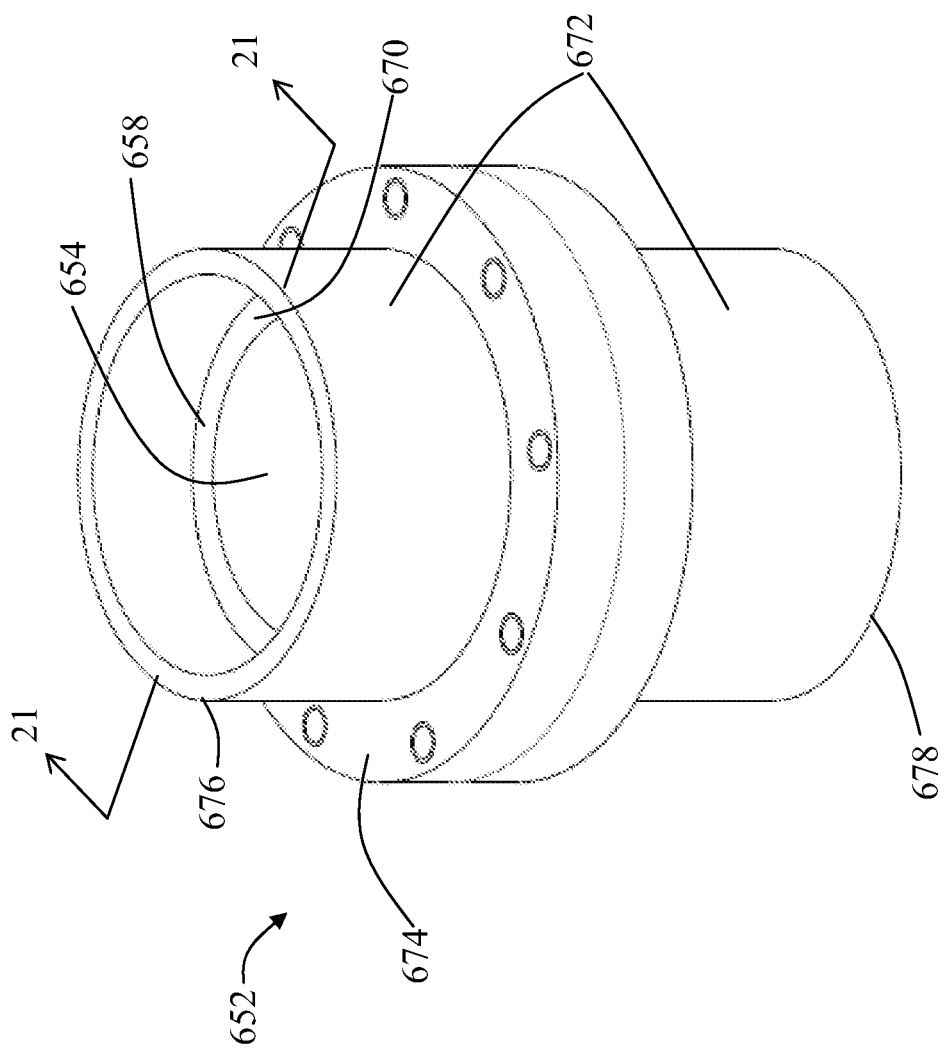
FIG. 20 is a perspective view of a generator hub of the generator of FIG. 13.
Figure 21:
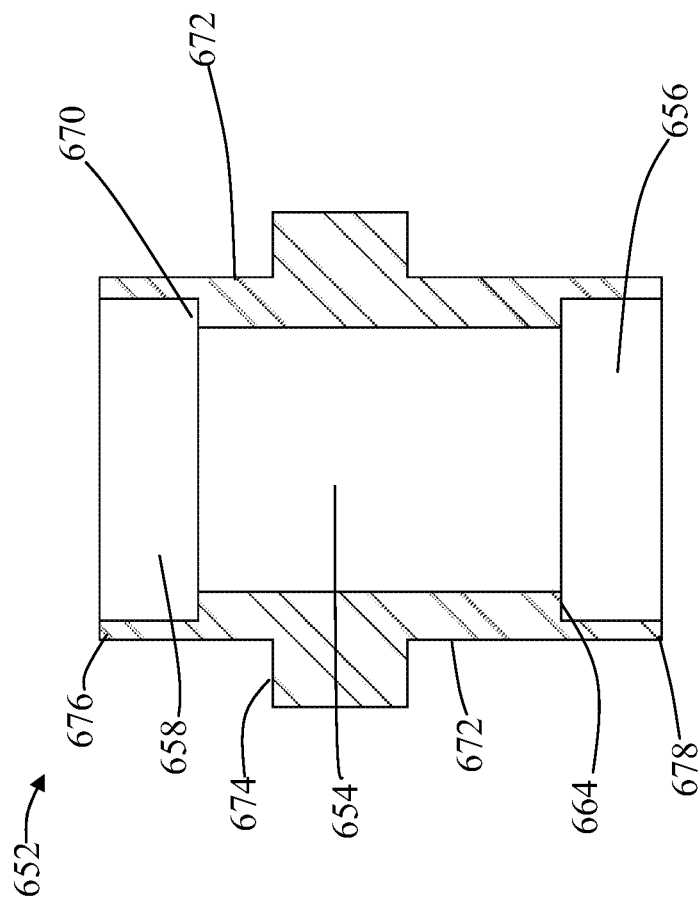
FIG. 21 is a cross-sectional view of the generator hub of FIG. 20 taken along line 21-21.

As shown in FIG. 19, the lower generator flywheel 604 also includes a substantially smooth outer surface 634 that includes a recess 638. In the embodiment shown in FIG. 18, the outer surface 634 does not include any magnets. However, one of skill in the relevant art will understand that the outer surface 634 may or may not include additional magnets as needed.

The generator shaft 606 has a generally circular cross-sectional shape and is inserted through an opening 640 on the upper generator flywheel 602 and an opening 642 on the lower generator flywheel 604. The generator shaft 606 may be formed of materials including but not limited to mild steel, stainless steel, other metallic materials, composite materials, or other similar materials. As can be seen in FIG. 19, the generator shaft 606 includes a main body 644, an upper end 646, a lower end 648, and a ring 650. The upper end 646 has a slightly smaller cross-sectional shape than the cross-sectional shape of the main body 644. The ring 650 is positioned along the main body 644 adjacent the lower end 648. However, one of skill in the art will understand that the ring 650 may be positioned in any appropriate location along the length of the generator shaft 606.

In some embodiments, a generator hub 652 may be used to couple the upper generator flywheel 602 and the lower generator flywheel 604 to the generator shaft 606. The generator hub 652 may be formed of materials including but not limited to mild steel, stainless steel, other metallic materials, composite materials, or other similar materials. In the embodiment best illustrated in FIGS. 20 and 21, the generator hub 652 has a generally cylindrical shape with a circular cross-sectional central bore 654. The central bore 654 is shaped to receive a portion of the main body 644 of the generator shaft 606. In some embodiments, such as the example shown in FIGS. 22-26, the central bore 654 is sized to allow some space between the generator shaft 606 and the generator hub 652. The central bore 654 expands to a first larger cross-sectional receptacle 656 at one end and a second larger cross-sectional receptacle 658 at a second end.

The first receptacle 656 is shaped to receive a first bearing 660 (see, e.g., FIG. 22). The first bearing 660 includes an aperture 662 that is shaped to receive a portion of the main body 644 of the generator shaft 606. In one embodiment, the first bearing 660 comprises a plurality of tapered roller bearings. However, one of skill in the art will understand that any appropriate bearing design may be used. The first bearing 660 is sandwiched between the ring 650 of the generator shaft 606 on a lower side and a ledge 664 on an upper side, where the ledge 664 is formed at the transition point between the central bore 654 and the first receptacle 656.

The second receptacle 658 is shaped to receive a second bearing 666. Like the first bearing 660, the second bearing 666 also includes an aperture 668 that is shaped to receive a portion of the main body 644 of the generator shaft 606. In one embodiment, the second bearing 666 comprises a plurality of tapered roller bearings. However, one of skill in the art will understand that any appropriate bearing design may be used. The second bearing 666 rests on a ledge 670, where the ledge 670 is formed at the transition point between the central bore 654 and the second receptacle 658. When the generator 600 is assembled, the second bearing 666 is sandwiched between the ledge 670 and a fastener 744 that is configured to couple to a first portion of the upper end 646 of the generator shaft 606.

A second portion of the upper end 646 is also configured to couple to a third bearing 746. The third bearing 746 includes an aperture 748 that is shaped to receive the second portion of the upper end 646 of the generator shaft 606. In one embodiment, the third bearing 746 comprises a plurality of straight roller bearings. However, one of skill in the art will understand that any appropriate bearing design may be used. The third bearing 746 rests on fastener 744. When the generator 600 is assembled, the fastener 744 is sandwiched between the fastener 744 on an lower side and an upper receptacle 730 located on an inner surface of the generator casing 608.

The generator hub 652 also includes an outer surface 672. In some embodiments, a ring 674 is coupled to the outer surface 672. The ring 674 has an inner cross-sectional shape that substantially conforms to the outer cross-sectional shape of the generator hub 652. In some embodiments, such as the embodiment shown in FIGS. 20-21, the ring 674 is integrally formed with the generator hub 652. In other embodiments, the ring 674 is attached to the generator hub 652. In the embodiment illustrated in FIGS. 20-21, the ring 674 has a circular outer cross-sectional shape, but one of skill in the relevant art will understand that the outer cross-section shape of the ring 674 may have any suitable shape including but not limited to rectilinear, oval, trapezoidal, parabolic, hexagonal, pentagonal, or octagonal.

The upper generator flywheel 602 and the lower generator flywheel 604 are positioned along the outer surface 672 of the generator hub 652 adjacent the ring 674. One end 676 of the generator hub 652 is shaped to pass through the opening 640 on the upper generator flywheel 602, and a second end 678 of the generator hub 652 is shaped to pass through the opening 642 on the lower generator flywheel 604. As a result, the two generator flywheels 602 and 604 are separated by the thickness of the ring 674. The upper generator flywheel 602 and the lower generator flywheel 604 are positioned relative to one another so that the inner surface 624 and the inner surface 632 are facing each other. The polarity of the magnet surfaces 622 and 630 cause the two generator flywheels 602 and 604 to rotate relative to one another around the generator shaft 606 until each magnet surface 622 is positioned adjacent the magnet surface 630 having an opposite polarity. The upper generator flywheel 602 and the lower generator flywheel 604 are secured to the ring 674 via mechanical fasteners including but not limited to bolts, screws, rivets, or other suitable fastening devices. The assembly of the upper generator flywheel 602, the lower generator flywheel 604, and the ring 674 forms a rotating component 680 of the generator 600.

The upper generator flywheel 602, the lower generator flywheel 604, the generator hub 652, and the generator shaft 606 are enclosed by the generator casing 608. The generator casing 608 is formed of at least three sections comprising an upper section 682, a middle section 684, and a lower section 686. In the embodiment best illustrated in FIG. 13, the entire generator casing 608 has a substantially cubic shape. Because the upper section 682, the middle section 684, and the lower section 686 are configured to fit together to form the generator casing 608, each of these sections have substantially the same inner and outer cross-sectional shapes, the main differences being that the upper section 682 includes an enclosed end 688 and the lower section 686 include an enclosed end 690, whereas the middle section 684 does not include enclosed ends.

The generator casing 608 can be formed of any suitable construction material, including but not limited to polypropylene, aluminum, ABS, ABS+, polylactic acid, mild steel (such as A36 mild steel), and acetal (such as Delrin®). In one embodiment, the generator casing 608 is formed from a polypropylene co-polymer.

Figure 26:
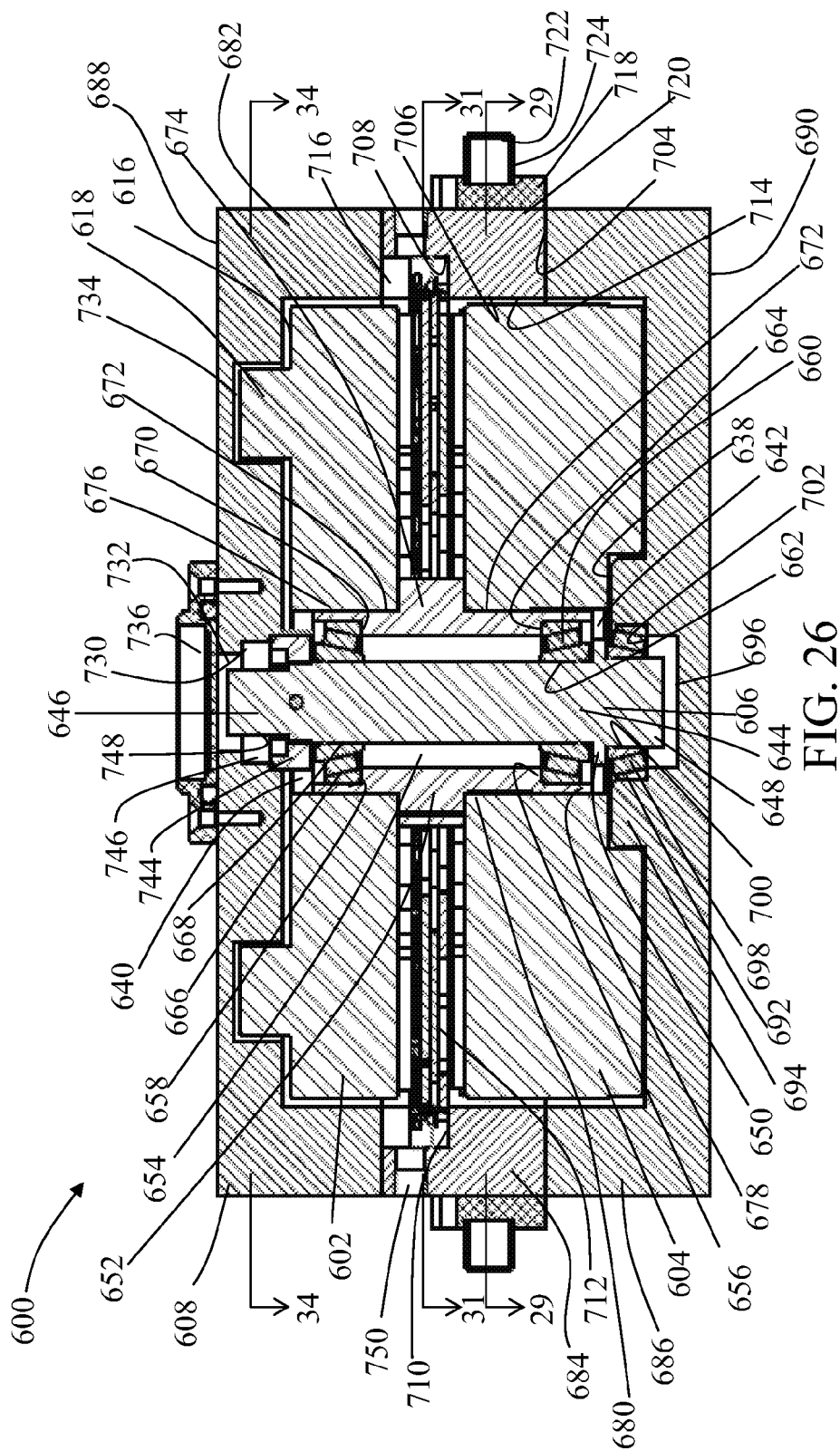
FIG. 26 is a cross-sectional view of the generator of FIG. 13 taken along line 22-22.
Figure 30:
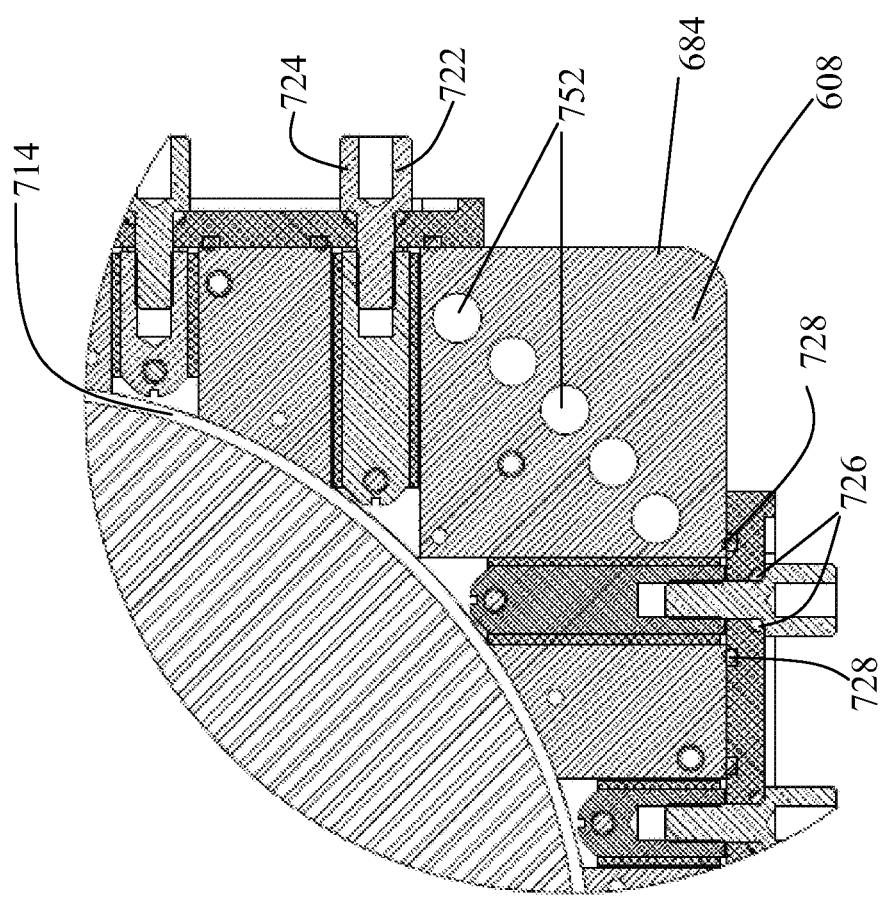
FIG. 30 is a partial cross-sectional view of the generator of FIG. 29.
Figure 34:
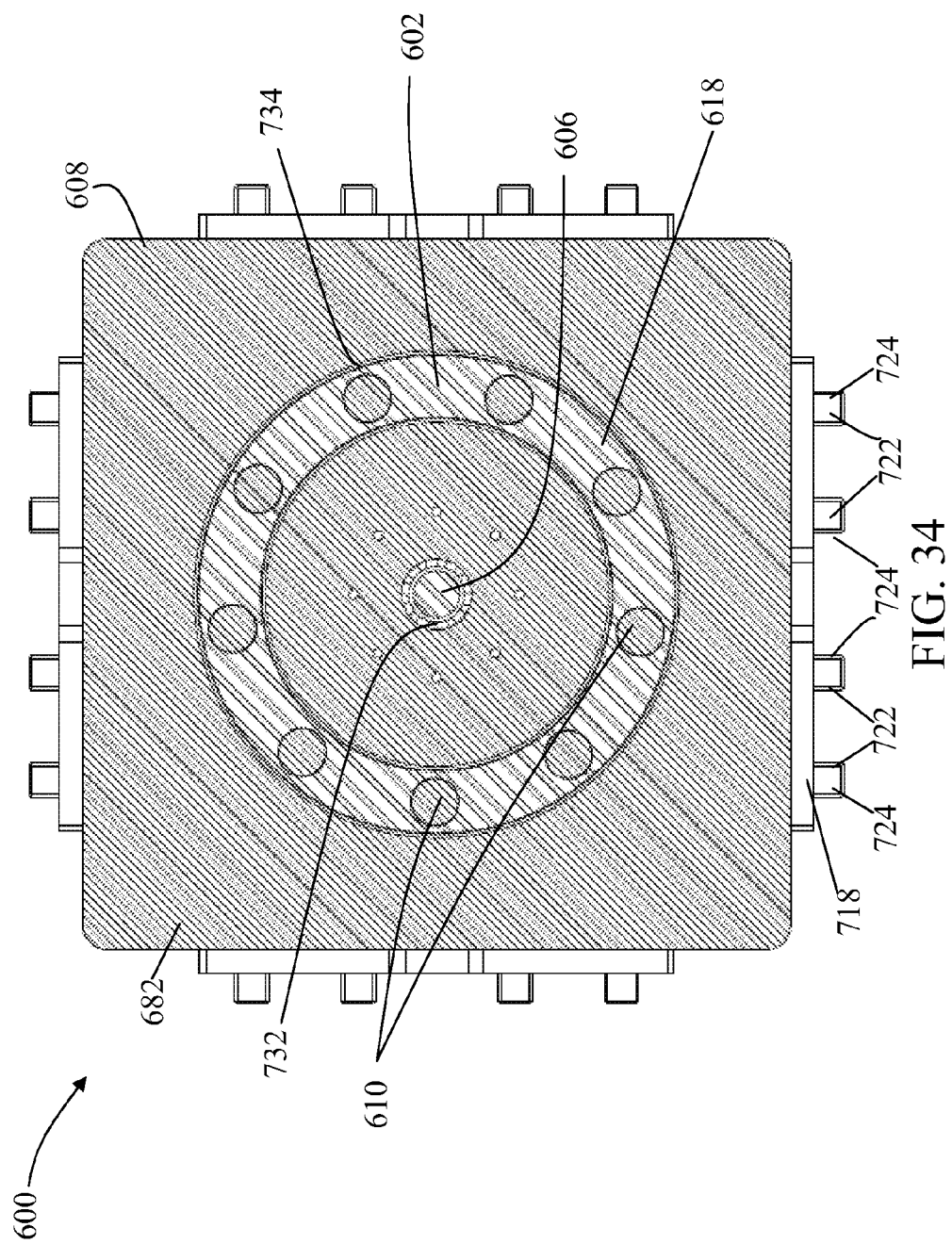
FIG. 34 is a cross-sectional view of the generator of FIG. 26 taken along line 34-34.

As shown in FIG. 26, the lower section 686 also includes a lower receptacle 692, a projection 694, and a recess 696. The lower receptacle 692 is surrounded by the projection 694. The lower receptacle 692 is shaped to receive a fourth bearing 698. The fourth bearing 698 includes an aperture 700 that is shaped to receive a portion of the lower end 648 of the generator shaft 606. In one embodiment, the fourth bearing 698 comprises a plurality of tapered roller bearings. However, one of skill in the art will understand that any appropriate bearing design may be used. The fourth bearing 698 rests on a ledge 702; the ledge 702 is formed at the transition point between the lower receptacle 692 and the recess 696. When the generator 600 is assembled, the fourth bearing 698 is sandwiched between the ring 650 of the generator shaft 606 on an upper side and the ledge 702 on a lower side.

The projection 694 on the lower section 686 of the generator casing 608 is shaped to be inserted within the recess 638 of the outer surface 634 of the lower generator flywheel 604. In some embodiments, the inner cross-sectional shape of the lower section 686 has a diameter that ranges from 0.01 inches to 0.02 inches larger than the outer diameter of the lower generator flywheel 604. In some embodiments, at least a portion of the lower generator flywheel 604 extends above an upper surface 704 of the lower section 686.

It is desirable to use the nested combination of the first bearing 660 and the fourth bearing 698 (and the similar nested combination of the second bearing 666 and the third bearing 746) because the combination of bearings at each end of the generator shaft 606 and the generator hub 652 minimizes the amount of torque applied to the generator shaft 606 when the generator hub 652 suddenly accelerates. If the generator shaft 606 were fixedly coupled to the generator casing 608, then excessive torque would be applied to the generator shaft 606 by the generator hub 652.

To assemble the generator 600, the fourth bearing 698 is inserted in the lower receptacle 692 of the lower section 686 of the generator casing 608. The lower end 648 of the generator shaft 606 is coupled to the recess 696. The first bearing 660 is then inserted over the generator shaft 606 until the first bearing 660 rests on the ring 650 of the generator shaft 606.

Separately, the rotating component 680 is partially assembled. The lower generator flywheel 604 is coupled to the generator hub 652 adjacent a lower side of the ring 674 via mechanical fasteners. The generator hub 652 is then inserted over the generator shaft 606 until the first receptacle 656 is positioned adjacent the first bearing 660 and the central bore 654 surrounds a substantial portion of the main body 644 of the generator shaft 606.

The middle section 684 of the enclosure is then assembled over the lower section 686. The middle section 684 has a central opening 706 that is shaped to surround the portion of the lower generator flywheel 604 that extends above the upper surface 704 of the lower section 686. In some embodiments, the cross-sectional shape of the central opening 706 has a diameter that ranges from 0.01 inches to 0.02 inches larger than the outer diameter of the lower generator flywheel 604.

The central opening 706 transitions to a larger cross-sectional opening 708 to form a ledge 710. The middle section 684 includes a plurality of coils 712 that are coupled to an interior side 714 of the middle section 684 adjacent the ledge 710. The coils 712 may be formed of materials including but not limited to copper or other similar conductive materials. The coils 712 may also be coated with a high temperature polymeric coating to prevent shorting out when the coils 712 contact one another. The plurality of coils 712 are positioned adjacent the inner surface 632 of the lower generator flywheel 604 and surrounding the ring 674.

The plurality of coils 712 may be arranged in a multi-layer configuration. For example, in the embodiment shown in FIGS. 26-28 and 32-33, the configuration includes a first layer 738, a second layer 740, and a third layer 742. Each layer is rotated slightly with respect to the other layers. In the specific embodiment shown in FIGS. 32-33, the third layer 742 is rotated approximately 8 degrees with respect to the second layer 740, and the second layer 740 is rotated approximately 8 degrees with respect to the first layer 738. The exact amount of rotation is determined by the total number of coils present in each layer. In the embodiment shown in FIGS. 32-33, each layer has a total of fifteen coils, which translates into a total distance of 24 degrees between each coil. However, one of skill in the relevant art will understand that any appropriate number of coils or layer configuration may be used.

Within each layer, the plurality of coils 712 are divided into three phases (A, B, and C) that are effectively spaced apart by 120 degrees, and the coils 712 within each phase are sequentially coupled to one another and evenly distributed around the circumference of each layer. Specifically, the outside wind of one coil 712 within each phase is coupled to the inner wind of a second coil 712 within the same phase and the same layer. Thus, a total of nine separate coils 712 (A1, B1, C1, A2, B2, C2, A3, B3, and C3) are formed within the plurality of coils 712.

For example, the plurality of coils 712A are sequentially connected to one another, but each coil 712A is separated from another coil 712A by a coil 712B and a coil 712C. Similarly, the plurality of coils 712B are sequentially connected to one another, but each coil 712B is separated from another coil 712B by a coil 712A and a coil 712C. Finally, the plurality of coils 712C are sequentially connected to one another, but each coil 712C is separated from another coil 712C by a coil 712A and a coil 712B.

The resulting Voltage A produced by the plurality of coils 712 A is 120 degrees out of phase from the Voltage B produced by the plurality of coils 712B, and the resulting Voltage B produced by the plurality of coils 712B is 120 degrees out of phase from the Voltage C produced by the plurality of coils 712C.

Moreover, due to the rotation between the three layers 738, 740, and 742, the Voltage A from the first layer 738 is eight degrees out of phase with the Voltage A from the second layer 740, and the Voltage A from the second layer 740 is eight degrees out of phase with the Voltage A from the third layer 742. The same pattern is seen for the Voltage B's from each layer and the Voltage C's from each layer. As a result, the configuration of the plurality of coils 712 produces a nine-phase voltage output.

In some embodiments, a second ring 716 is positioned above the plurality of coils 712 adjacent the ledge 710, where the second ring 716 is shaped to have an outer diameter that substantially corresponds to the shape of the larger cross-sectional opening 708 and an inner diameter that substantially corresponds to a diameter that ranges from 0.01 inches to 0.02 inches larger than the outer diameter of the upper generator flywheel 602. The purpose of the second ring 716 is to act as a clamp to hold the coils 712 in place.

At least one connection plate 718 is coupled to an exterior surface 720 of the middle section 684. In some embodiments, such as the embodiment shown in FIGS. 29, 31, and 34, four connection plates 718 connected to the four exterior surfaces of the middle section 684. The connection plate 718 includes at least two connectors 722. In some embodiments, the connection plate 718 includes four connectors 722. Each connector 722 includes a metal receptacle 724, an outer o-ring 726, and an inner o-ring 728. The metal receptacle 724 is configured to be inserted through the connection plate 718 and at least partially through the wall of the middle section 684. The metal receptacle 724 may be formed of materials including but not limited to brass or other similar conductive materials. An exterior end of the metal receptacle 724 protrudes from an exterior side of the connection plate 718. The outer o-ring 726 is positioned between the metal receptacle 724 and the connection plate 718. The inner o-ring 728 is positioned between the connection plate 718 and the exterior surface 720 of the middle section 684. Both o-rings 726 and 728 may be formed of any suitable material including but not limited to nitrile rubber, Buna N rubber, or other similar elastic materials that form a seal. The positioning of o-rings 726 and 728 is designed to prevent the introduction of air into the generator 600.

In the embodiments of the coils 712 having a nine-phase voltage output, each one of the nine voltage outputs is coupled to a different connector 722 to transfer each voltage output separately from the generator 600, where external wires are coupled to each of the connectors 722. In the particular embodiment where each connection plate 718 includes four connectors 722, there are five open connectors 722. As a result, this embodiment provides for up to sixteen-phase voltage output without the need to add additional connectors 722.

At least one connection port 750 is located on the exterior surface 720 of the middle section 684 adjacent the connection plate 718. In some embodiments, such as the embodiments shown in FIGS. 13, 14, 23, 24 and 26, a connection port 750 may be located on one or more of the four exterior surfaces of the middle section 684. Each connection port 750 may be utilized for a different purpose. For example, one connection port 750 may be used for the purpose of applying a vacuum to the generator 600. A second connection port 750 may be used to couple pressure gauge to monitor the pressure within the generator 600. In some embodiments, it is desirable to maintain the pressure at approximately 0 psi. In the embodiments where the generator casing 608 is formed of a polypropylene co-polymer and placed under vacuum, it is desirable to have the thickness of the generator casing 608 as thick as possible to prevent collapse. In these embodiments, use of a track 734 within the upper section 682 that is shaped to substantially conform to the shape of the raised ring 618 provides a way to have a thin region in the area where the turbine clutch magnets 490 and the generator clutch magnets 610 are coupled, while maintaining a greater thickness throughout the remained of the generator casing 608. Typically, it is desirable to maintain the thickness of the generator casing 608 walls at approximately 0.25 inches. In embodiments where the interior of the generator casing is maintained in a vacuum, all connection ports 750 will need to be appropriately sealed, using o-rings or other suitable sealing elements.

A third and fourth connection ports 750 may be used to connect a cooling system 270 to the generator 600, where one of the connection ports 750 is an inlet and the other connection port 750 is an outlet for the cooling system 270. One embodiment of a cooling system 270 is described in more detail below. One of skill in the relevant art will understand that any appropriate cooling system may be used throughout the generator casing 608 to cool the generator 600. In some embodiments, a plurality of tubes 752 are positioned within the generator casing 608 to provide a circulation path for the coolant. In some embodiments where the generator casing 608 is formed of plastic material, the tubes 752 may integrally formed with the generator casing 608. In some embodiments, a thermistor is embedded with the coils 712 to provide temperature information with the current flowing from the generator 600.

The upper generator flywheel 602 is then assembled over the generator hub 652 and adjacent the ring 674, the plurality of coils 712, and optionally the second ring 716. When the upper generator flywheel 602 is secured to the ring 674 via mechanical fasteners, the rotating component 680 has been assembled. The second bearing 666 is then positioned within the second receptacle 658 of the generator hub 652. The fastener 744 is then coupled to the first portion of the upper end 646 of the generator shaft 606.

A second portion of the upper end 646 is also configured to couple to a third bearing 746. The third bearing 746 includes an aperture 748 that is shaped to receive the second portion of the upper end 646 of the generator shaft 606. In one embodiment, the third bearing 746 comprises a plurality of straight roller bearings. However, one of skill in the relevant art will understand that any appropriate bearing design may be used. The third bearing 746 is configured to be received by an upper receptacle 730 located on an inner surface of the generator casing 608. When the generator 600 is assembled, the fastener 744 is sandwiched between the fastener 744 on an lower side and the upper receptacle 730.

Finally, the upper section 682 is prepared to be assembled over the upper generator flywheel 602. The upper section 682 includes the upper receptacle 730 that receives the third bearing 746. The third bearing 746 is inserted in the upper receptacle 730 of the upper section 682 of the generator casing 608. The upper section 682 is then assembled over the upper generator flywheel 602, so that the second portion of the upper end 646 of the generator shaft 606 is coupled to the third bearing 746.

In some embodiments, the upper section 682 also includes an aperture 732 that is shaped to allow access to the third bearing 746. In these embodiments, the enclosed end 688 includes a cover 736. The cover 736 serves as a means to seal the aperture 732 so that the generator casing 608 is atmospherically insulated. In other embodiments, the upper section 682 does not include the aperture 732 and, thus, there is no need to include the cover 736.

When the generator 600 and the turbine 300 are mechanically joined via any suitable mechanical means including but not limited to bolts that secure the two casings 500 and 608, the plurality of generator clutch magnets 610 are magnetically coupled to the similarly arranged plurality of turbine clutch magnets 490 located in the base 414 of turbine flywheel 400. When the turbine 300 and the generator 600 become magnetically coupled, the generator hub 652 is lifted off the first bearing 660 so that the assembled upper generator flywheel 602, lower generator flywheel 604, and the generator hub 652 become magnetically suspended within the generator casing 608. The attraction between the turbine clutch magnets 490 and the plurality of generator clutch magnets 610, the attraction between the plurality of generator coupling magnets 620 and the plurality of generator coupling magnets 626, and the operation of gravity cause the assembled upper generator flywheel 602, lower generator flywheel 604, and the generator hub 652 to be locked into place so that the suspended components are not in physical contact with any surface of the generator shaft 606, the generator casing 608, and the plurality of coils 712.

When the turbine flywheel 400 begins to rotate as described above, the turbine flywheel 400 causes the rotating component 680 to begin to rotate. The rotating component 680 is configured to rotate at speeds ranging from approximately 500 rpm to 4000 rpm. In order to minimize the amount of heat produced through friction caused by the rotating component 680, the generator 600 is placed under negative pressure. By minimizing the amount of air internal to the generator 600, there is virtually no resistance encountered by the rotating component 680. Negative pressure within the generator 600 also reduces electrical noise in the generator 600 that would otherwise occur due to static electricity from air in the generator 600.

The rotation of the rotating component 680 generates an electrical current in the plurality of coils 712. The electrical current passes through the plurality of coils 712 to the at least two connectors 722, where the electrical current passes out of the generator 600. The generator 600 is configured to produce electricity in the range of 10 kw to 25 kw.

The generator 600 provides power on demand; its rotational speed can be altered to change the power output level as desired, by changing rotational speed of the turbine 300. This is as opposed to traditional constant-speed generators that are directly coupled to the power grid, where the 60 Hz cycles dictate the generators' rotational speed. Because the generator 600 is not directly coupled to the power grid, the generator 600 is able to rotate at any speed and produce an electrical current with varying frequency.

The operation of the turbine 300 and generator 600 is thus regulated based on the electrical load placed thereon. An electrical load in, for example, a home, is monitored and measured by a load sensor 210 (see FIG. 1), which provides an input 240 to the external control computer 250. Those skilled in the art will appreciate how a load sensor 210 may be coupled to the output of the generator 600. The external control computer 250 may be powered by the external batteries 255. Based on the monitored load, the external control computer 250 sends control signals 220 to the nozzles 150 (i.e., logic-based controllers that actuate the nozzles 150) to control the amount and timing of compressed air provided to the turbine blades 415. The external control computer 250 also sends control signals 251 to the casing electromagnets 514, the satellite magnet assemblies 520 and the DC motor 580, as described above. As also described, the external control computer 250 communicates wirelessly with the CPU 445 located in the turbine generator assembly 400, which controls the activation/deactivation/switching of the flywheel electromagnets 430.

If an additional electrical load is added to the system, the load sensor 210 acts as a feedback system, sensing the increase in load and sending a signal 240 to the external control computer 250. The external control computer 250 in turn instructs the nozzles 150 to open (e.g., in timed pulses), thereby injecting more compressed air onto the turbine blades 415. The external control computer 250 can also: instruct the flywheel electromagnets 430 and the casing electromagnets 514 to activate/deactivate/switch polarity at a faster rate; instruct the satellite magnet assemblies 520 to rotate at a faster; and/or instruct the DC motor 580 to rotate at a faster rate. All of these actions will increase the torque applied to the turbine flywheel assembly 400 and its rotational speed, which due to the magnetic clutch between the turbine flywheel assembly 400 and the upper generator flywheel 602, results in the generation of additional power 260 to compensate for the increased load.

The generator 600 may be connected to a power inverter, converter or other suitable device for converting the variable frequency electrical current produced by the generator 600 into AC current with the frequency in sync with the power grid. For example, the electrical current produced by the generator 600 may be converted into direct current and then converted back to AC current with a frequency to match that of the power grid. By connecting the generator 600 to the power grid in this manner, it can be used to sell power to the electrical companies.

Additional energy can be conserved with the use of the cooling system 270, which recycles heat produced in the generator 600 (due to resistance losses in the coils 712). A coolant in a closed-loop coil is circulated through the cooling system 270 in the generator 600, where it is heated. As shown in FIG. 1, the cooling system may be interconnected with the output of the compressed air tanks 130 (e.g., at the nozzles 150). In this configuration, the heated coolant moves, (e.g., by natural convection) to the compressed air system and passes across the air entering the nozzles 150, thus preheating the compressed air entering the turbine 300. By preheating this compressed air, the energy value of the compressed air is increased. The cooling system 270 thus uses heat produced in the generator 600 that would otherwise be lost and returns at least some of it to the system to increase the energy of the compressed air impacting the turbine blade assembly(ies) 410 in the turbine 300.

The foregoing is provided for purposes of illustrating, explaining, and describing embodiments of the present invention. Further modifications and adaptations to these embodiments will be apparent to those skilled in the art. The features and aspects of the present invention have been described or depicted by way of example only and are therefore not intended to be interpreted as required or essential elements of the invention unless otherwise so stated. It should be understood, therefore, that the foregoing relates only to certain exemplary embodiments of the invention, and that numerous changes and additions may be made thereto without departing from the spirit and scope of the invention as defined by any appended claims.

What is claimed is:

1. A turbine-generator system for generating electrical power, comprising:
    a power source connected to a compressor, wherein the power source converts a renewable energy into mechanical power to drive the compressor;
    one or more pressurized tanks connected to the compressor for storing compressed air output by the compressor;
    a turbine connected to the one or more pressurized tanks via one or more nozzles, the turbine comprising a plurality of turbine blades and a turbine flywheel each rotatably mounted to a shaft, the one or more nozzles aligned with the turbine blades to deliver compressed air thereto;
    wherein the turbine further comprises a magnet motor for selectably applying torque to the turbine flywheel;
    a generator coupled to the turbine via a magnetic clutch, wherein the generator comprises a generator casing that houses within its interior an upper generator flywheel rotatably mounted to a generator shaft, a lower generator flywheel rotatably mounted to the generator shaft, and a plurality of coils positioned between the upper generator flywheel and the lower generator flywheel.

2. The turbine-generator system of claim 1, wherein the a power source is selected from the group consisting of: a solar panel, a wind turbine, a sterling engine, and a heat exchanger; and
    wherein the renewable energy is correspondingly selected from the group consisting of: solar energy, wind, naturally occurring temperature differentials, and energy produced from biomass or biofuel.

3. The turbine-generator system of claim 1, wherein the magnetic clutch comprises a first plurality of clutch magnets fixed to a base of the turbine flywheel and a second plurality of clutch magnets fixed to a top surface of the upper generator flywheel.

4. The turbine-generator system of claim 1, wherein the interior of the generator casing is maintained in a vacuum of approximately 0 psi.

5. The turbine-generator system of claim 1, further comprising a control computer external to the turbine, wherein the external control computer is in communication with the magnet motor for selectably controlling its rotational speed, and wherein the external control computer is in communication to the nozzles for controlling the amount and timing of the compressed air injected onto the turbine blades.

6. The turbine-generator system of claim 5, wherein the turbine further comprises a high-torque motor for providing torque to the turbine flywheel assembly; and
    wherein the external control computer is in communication with the high-torque motor for selectably controlling its rotational speed.

7. The turbine-generator system of claim 5, further comprising a load sensor coupled to an output of the generator and in communication with the external control computer.

8. The turbine-generator system of claim 5, wherein the turbine further comprises at least one satellite magnet assembly positioned inside the turbine casing and aligned with the magnet motor;
    wherein the at least one satellite magnet assembly comprises a motor, a shaft driven by the motor, and one or more permanent magnets mounted on the shaft; and
    wherein the external control computer is in communication with the at least one satellite magnet assembly for selectably controlling the rotational speed thereof.

9. The turbine-generator system of claim 1, wherein the turbine further comprises a high-torque motor for providing torque to the turbine flywheel assembly.

10. The turbine-generator system of claim 1, wherein the turbine further comprises at least one satellite magnet assembly positioned inside the turbine casing and aligned with the magnet motor; and
    wherein the at least one satellite magnet assembly comprises a motor, a shaft driven by the motor, and one or more permanent magnets mounted on the shaft.

* * * * *